US012488782B1

(12) United States Patent
Karlapati et al.

(10) Patent No.: US 12,488,782 B1
(45) Date of Patent: Dec. 2, 2025

(54) SYNTHETIC SPEECH PROCESSING RELATED TO PROSODY PREDICTION

(71) Applicant: Amazon Technologies, Inc., Seattle, WA (US)

(72) Inventors: Sri Vishnu Kumar Karlapati, Cambridge (GB); Zack Daniel Hodari, Edinburgh (GB); Alexis Pierre Jean-Baptiste Moinet, Cambridge (GB); Thomas Renaud Drugman, Carnieres (BE); Arnaud Vincent Pierre Yves Joly, Cambridge (GB); Syed Ammar Abbas, Cambridge (GB); Panagiota Karanasou, Cambridge (GB); Constanze Stypula, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/036,163

(22) Filed: Sep. 29, 2020

(51) Int. Cl.
*G10L 13/10* (2013.01)
*G10L 13/02* (2013.01)

(52) U.S. Cl.
CPC .............. *G10L 13/10* (2013.01); *G10L 13/02* (2013.01)

(58) Field of Classification Search
CPC ......... G10L 13/10; G10L 13/02; G10L 13/04; G10L 13/08; G10L 13/047; G10L 15/02; G10L 15/04; G10L 15/063; G10L 15/16; G10L 2013/105; G10L 2015/025; G10L 2015/027; G06N 3/0445; G06N 3/0454; G06N 3/02; G06N 3/08; G06N 3/084
See application file for complete search history.

(56) References Cited

U.S. PATENT DOCUMENTS

| | | | |
|---|---|---|---|
| 9,767,788 B2 * | 9/2017 | Li | G10L 13/10 |
| 2008/0177543 A1 * | 7/2008 | Nagano | G10L 15/04 |
| | | | 704/E15.005 |
| 2012/0166198 A1 * | 6/2012 | Lin | G10L 13/10 |
| | | | 704/260 |
| 2012/0191457 A1 * | 7/2012 | Minnis | G10L 13/10 |
| | | | 704/E13.011 |
| 2015/0364128 A1 * | 12/2015 | Zhao | G06N 3/02 |
| | | | 704/259 |
| 2019/0172443 A1 * | 6/2019 | Shechtman | G10L 13/047 |
| 2020/0074985 A1 * | 3/2020 | Clark | G10L 25/24 |
| 2021/0082408 A1 * | 3/2021 | Shechtman | G10L 15/1807 |
| 2021/0350795 A1 * | 11/2021 | Kenter | G06N 3/045 |

OTHER PUBLICATIONS

S. Shechtman and A. Sorin, "Sequence to sequence neural speech synthesis with prosody modification capabilities," 10th ISCA Speech Synthesis Workshop, Sep. 2019 (Year: 2019).*

(Continued)

*Primary Examiner* — Bhavesh M Mehta
*Assistant Examiner* — Nandini Subramani
(74) *Attorney, Agent, or Firm* — Pierce Atwood LLP

(57) ABSTRACT

A speech-processing system receives input data representing text. A prosody prediction component processes the input data to determine prosody embedding data corresponding to prosody of the text. A decoder processes the prosody embedding data and phoneme encoded data derived from the input data to determine audio output data corresponding to the text and the prosody.

19 Claims, 21 Drawing Sheets

(56) References Cited

OTHER PUBLICATIONS

Ming, H., He, L., Guo, H., & Soong, F. K. (2019). Feature reinforcement with word embedding and parsing information in neural TTS. arXiv preprint arXiv:1901.00707 (Year: 2019).*

C. Wu, C. Hsia, C. Lee and M. Lin, "Hierarchical Prosody Conversion Using Regression-Based Clustering for Emotional Speech Synthesis," in IEEE Transactions on Audio, Speech, and Language Processing, vol. 18, No. 6, pp. 1394-1405, Aug. 2010 (Year: 2010).*

Ming, et. al. (2019). Feature reinforcement with word embedding and parsing information in neural TTS (Year: 2019).*

C. Wu, et. al., "Hierarchical Prosody Conversion Using Regression-Based Clustering for Emotional Speech Synthesis, " in IEEE Transactions on Audio, Speech, and Language Processing, vol. 18, No. 6, pp. 1394-1405, Aug. 2010 (Year: 2010).*

\* cited by examiner

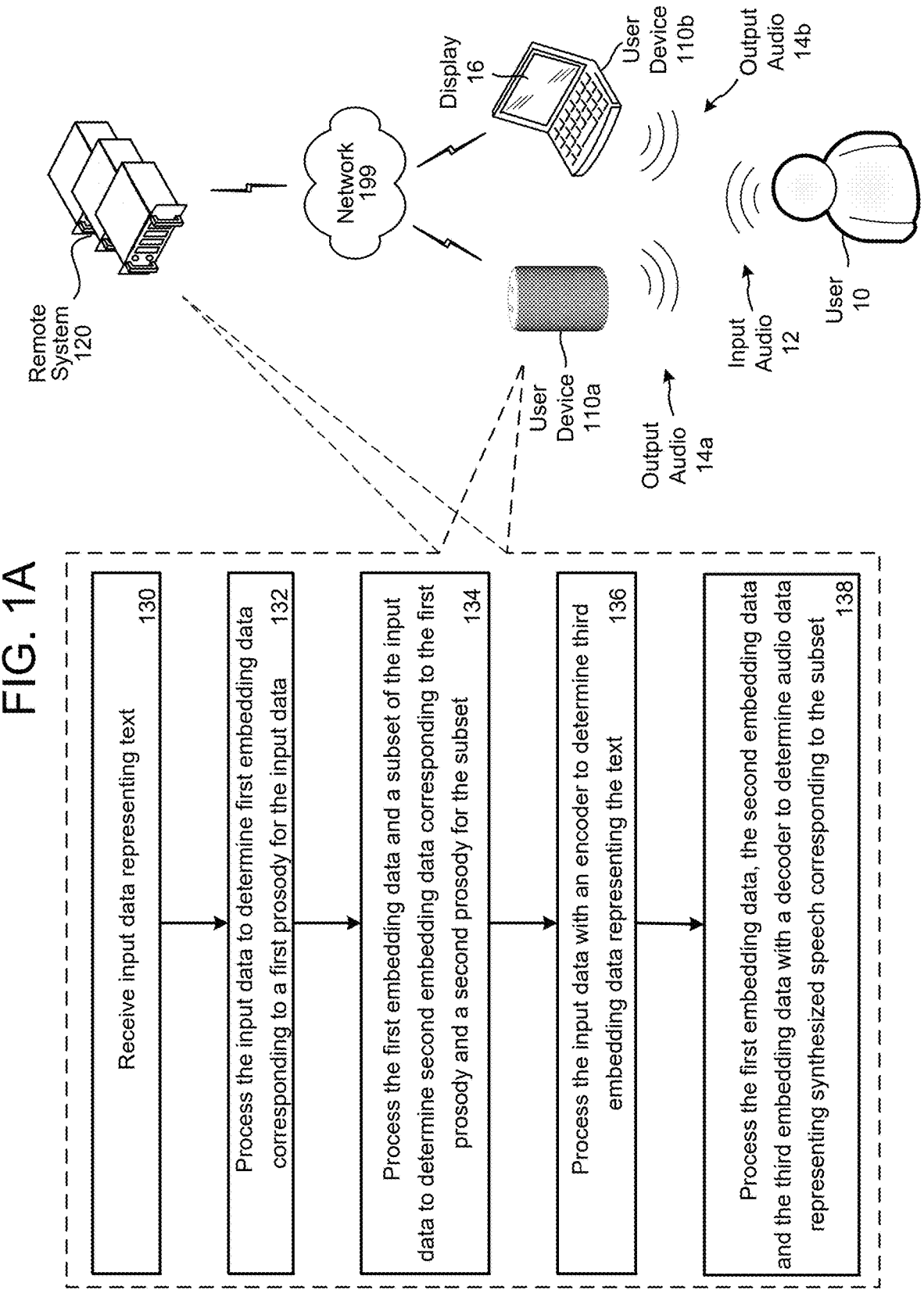

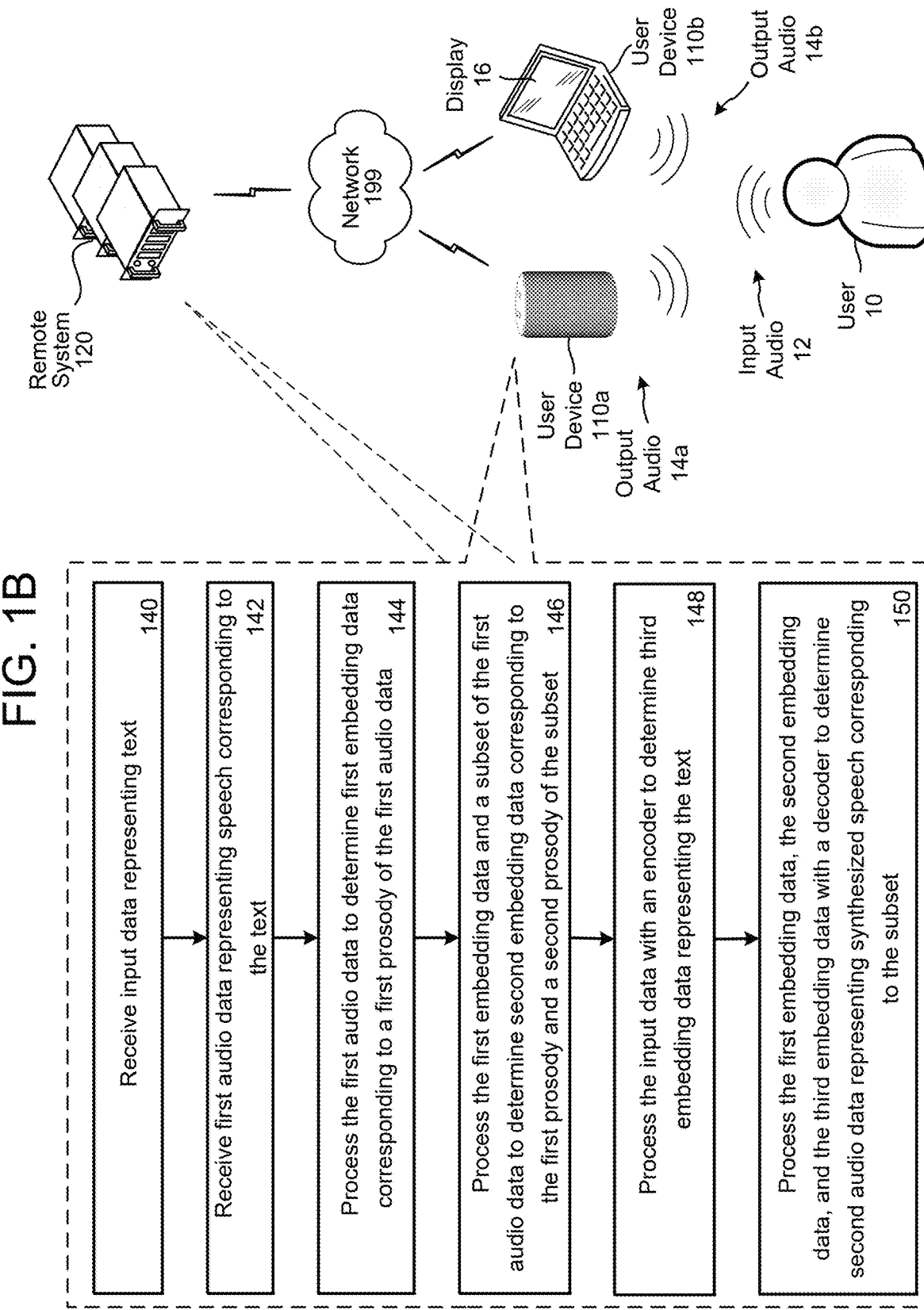

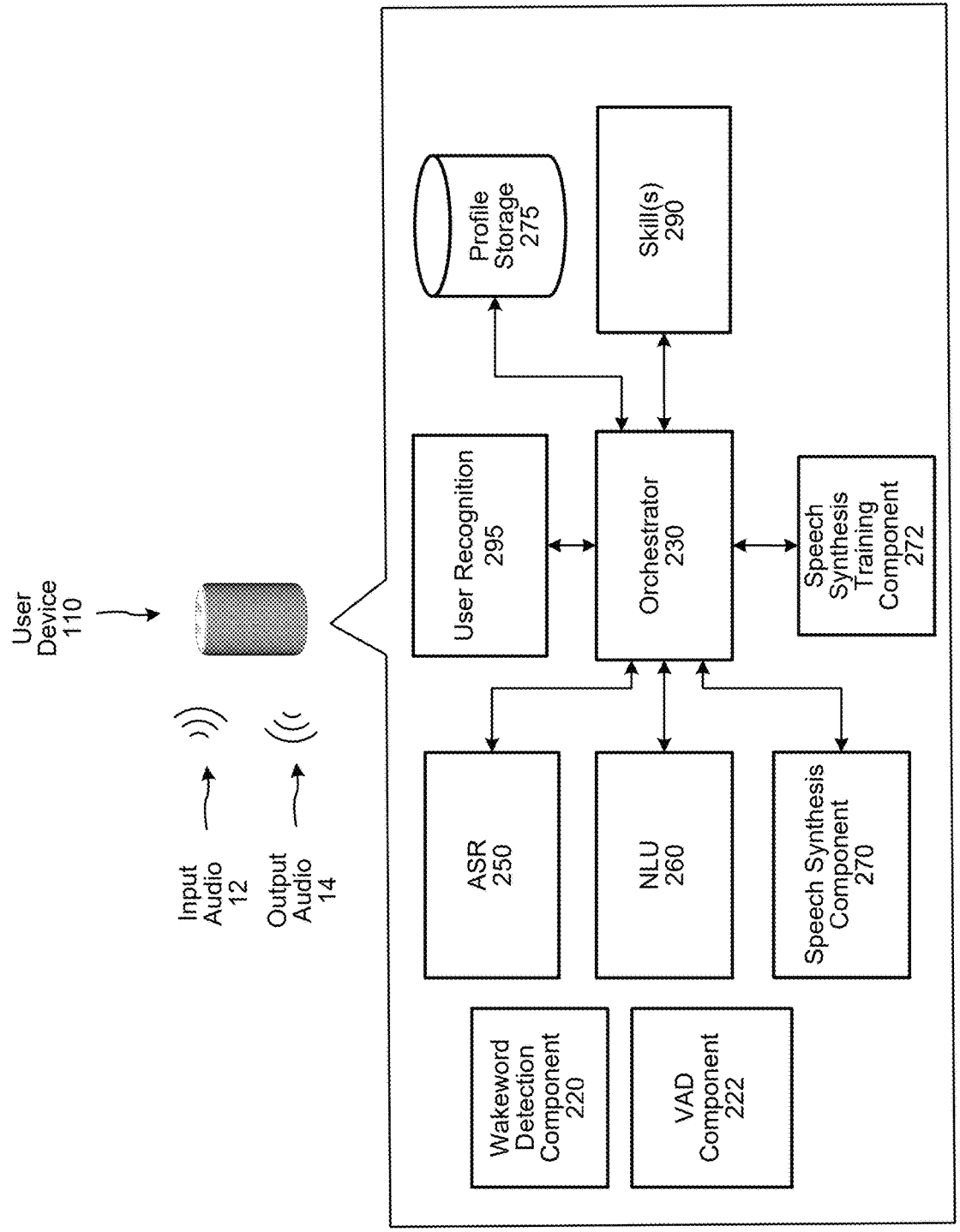

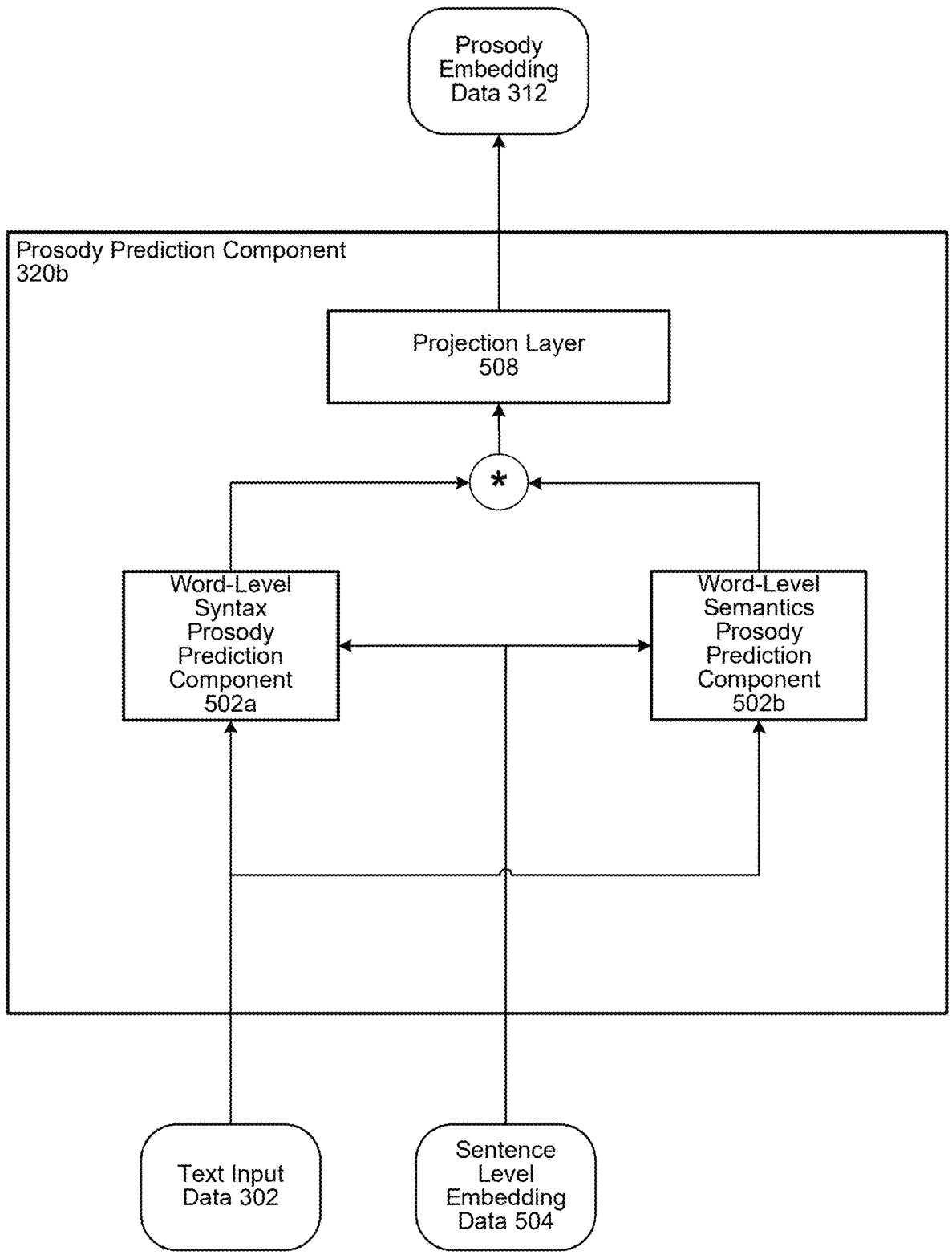

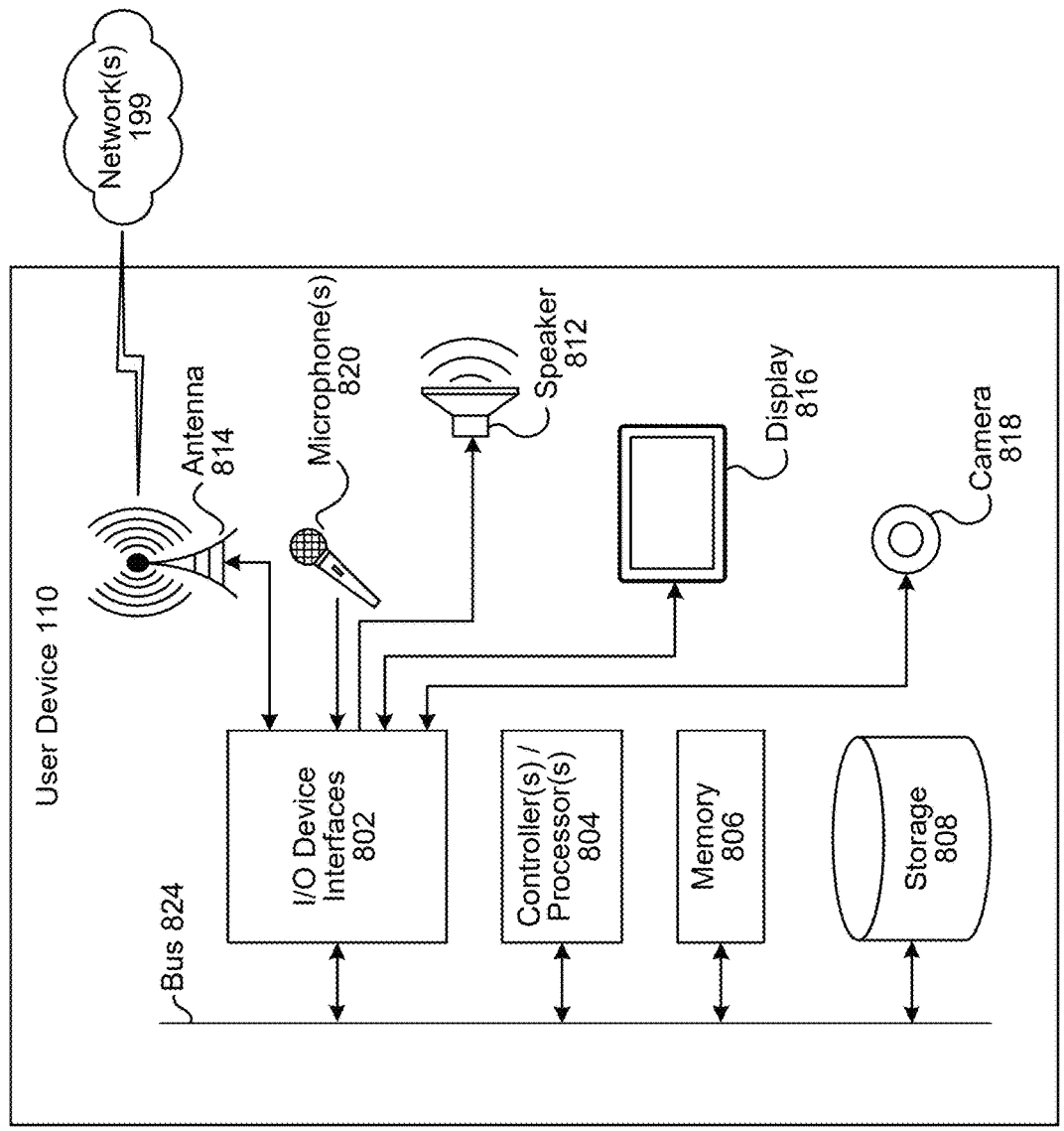

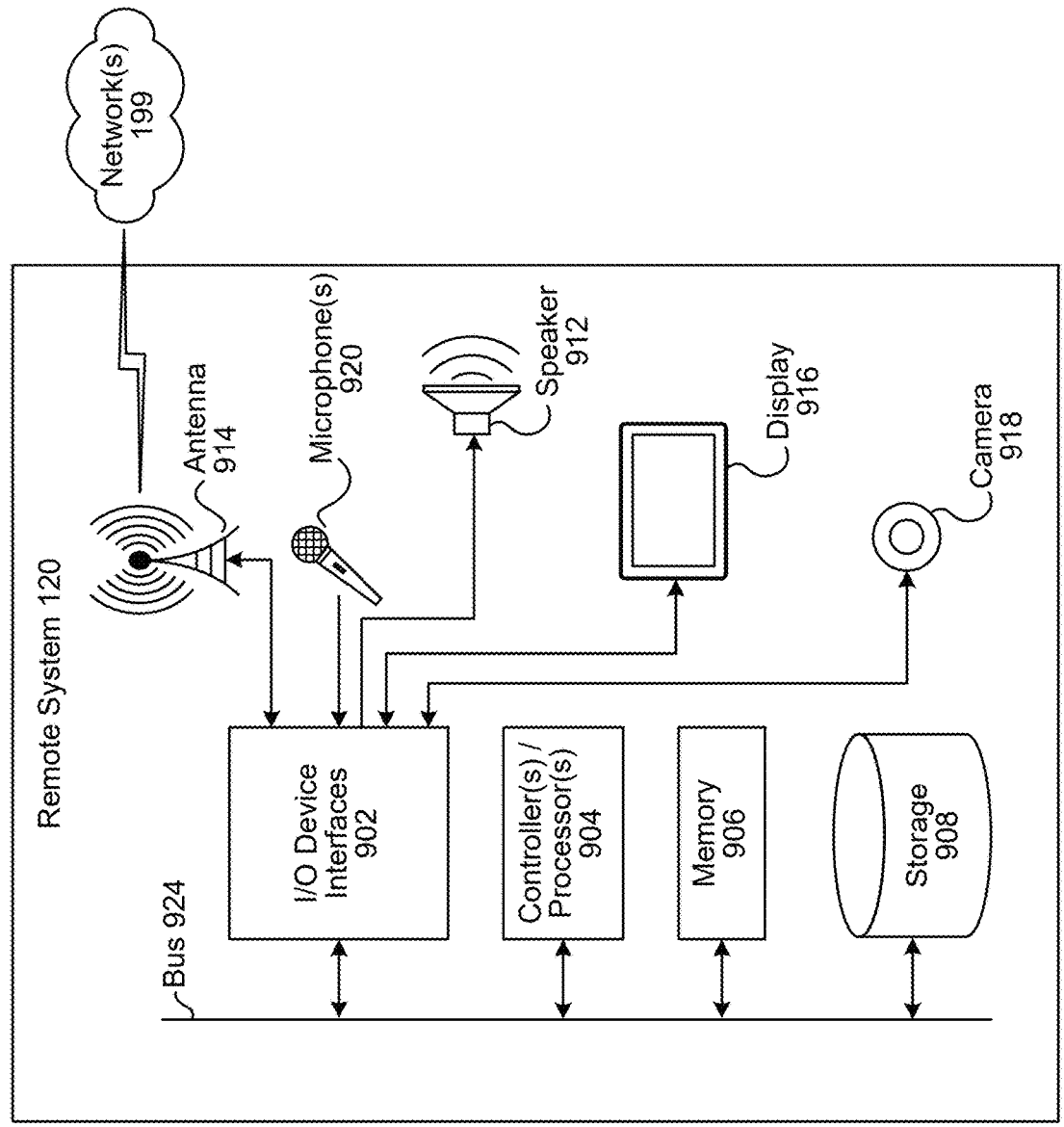

SYNTHETIC SPEECH PROCESSING RELATED TO PROSODY PREDICTION

BACKGROUND

A speech-processing system includes a speech-synthesis component for processing input data such as text data to determine output data that includes a representation of speech corresponding to the text data. The speech includes variations in prosody, such as variations in speech rate, emphasis, timbre, or pitch. The prosody of the speech may be learned by processing audio data and then determined by processing the text data.

BRIEF DESCRIPTION OF DRAWINGS

For a more complete understanding of the present disclosure, reference is now made to the following description taken in conjunction with the accompanying drawings.

FIGS. 1A and 1B illustrate methods for speech processing according to embodiments of the present disclosure.

FIG. 2B illustrates components of a user device for speech processing according to embodiments of the present disclosure.

FIGS. 5A, 5B, 5C, and 5D illustrate components for prosody prediction according to embodiments of the present disclosure.

FIG. 8 illustrates components of a user device for speech processing according to embodiments of the present disclosure.

FIG. 9 illustrates components of a remote system for speech processing according to embodiments of the present disclosure.

DETAILED DESCRIPTION

Figure 2A:
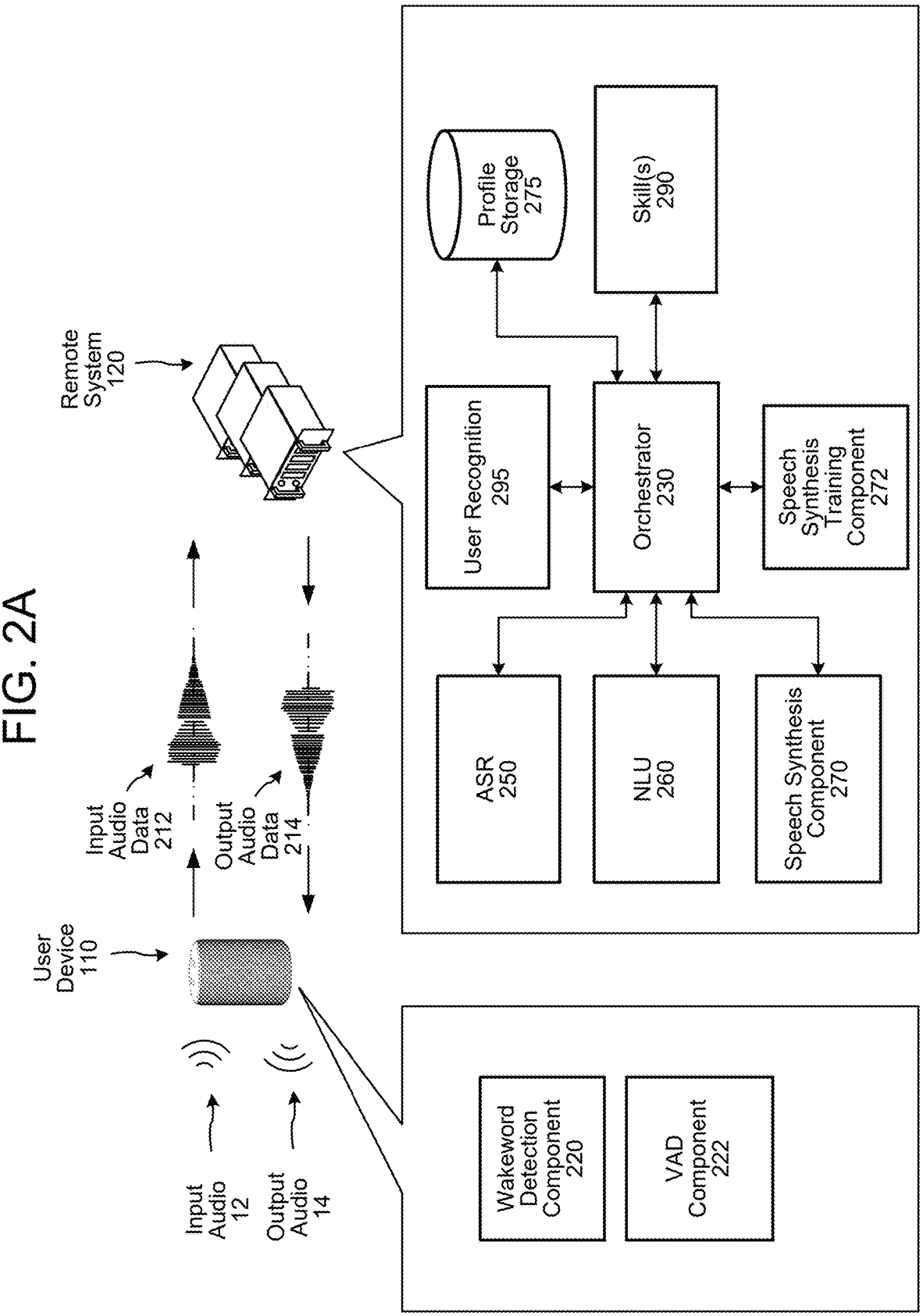
FIG. 2A illustrates components of a user device and of a remote system for speech processing according to embodiments of the present disclosure.

Speech-processing systems may include one or more speech-synthesis components that employ one or more of various techniques to generate synthesized speech from input data (such as text data or other data representing words such as word identifiers, indices or other indicators of words, word embedding data, etc.). The speech-synthesis component may include a phoneme encoder for processing the text data and determining phoneme embedding data representing a number of phonemes of the text data, a prosody prediction component for processing the text data to determine prosody embedding data corresponding to the predicted prosody of the text data, and a speech decoder for processing the phoneme encoded data and the prosody embedding data to determine output data representing the speech.

As the term is used herein, "prosody" refers to the manner in which a given word, sentence, paragraph, or other unit of speech is spoken. Aspects of prosody may include the rate of the speech, the loudness of the speech, how syllables, words, or sentences in the speech are emphasized, when and where pauses in the speech may be inserted, or what emotion (e.g., happy, sad, or anxious) is expressed in the speech.

Aspects of the present disclosure thus relate to predicting prosody to be applied to input data, such as text or other meaning representation data, and then using the predicted prosody to generate audio data representing speech that reflects the predicted prosody. The speech-synthesis component may first be trained using training data that includes text data and corresponding speech data exhibiting corresponding prosody. The training data may be, for example, audio data representing a voice actor reading written content, such as a book, and corresponding text data representing the text of the book or metadata describing the text, such as locations of word boundaries, sentence boundaries, or chapter boundaries. In parallel, a prosody prediction component may be trained to determine data representing the prosody using only the text as input. The prosody prediction component may then be used to process further text data and predict prosody therein. The speech-synthesis component may then use the output of the prosody-prediction component to generate audio data representing further audio data representing speech.

In various embodiments, the speech-processing system is disposed on a single device, such as a user device (e.g., Echo device, phone, tablet, Fire TV device, television, personal computer, etc.). In other embodiments, the speech-processing system is distributed across one or more user devices, such as a smartphone or other smart loudspeaker, and one or more remote systems, such as one or more server, storage, or computing machines. The user device may capture audio that includes human speech and then process the audio data itself or transmit the audio data representing the audio to the remote system for further processing. The remote system may have access to greater computing resources, such as more or faster computer processors, than does the user device, and may thus be able to process the audio data and determine an appropriate response faster than the user device. The user device may have, for example, a wakeword-determination component that detects presence of a wakeword in audio and transmits corresponding audio data to the remote system only when the wakeword is detected. As used herein, a "wakeword" is one or more particular words, such as "Alexa," "OK Google," and "Hey Siri," that a user of the user device may utter to cause the user device to begin processing subsequent audio data, which may further include a representation of a command, such as "tell me a funny story" or "read me the news."

The user device or remote system may include an automatic speech-recognition (ASR) component that processes the audio data to determine corresponding text data and a natural-language understanding (NLU) component that processes the text data to determine the intent of the user expressed in the text data and thereby determine an appropriate response to the intent. Determination of the response may include processing output of the NLU component using the speech-synthesis component, also referred to as a text-to-speech (TTS) processing component, to determine audio data representing the response. The user device may determine the response using a speech-synthesis component of the user device or the remote system may determine the response using a speech-synthesis component of the remote system and transmit data representing the response to the user device (or other device), which may then output the response. In other embodiments, a user of a user device may wish to transmit audio data for reasons other than ASR/NLU processing, such as one- or two-way audio communication with one or more other user devices or remote systems.

Referring to FIGS. 1A and 1B, a user 10 may provide input data to a voice-controlled user device 110a or a display-enabled user device 110b (e.g., a device featuring at least one display 16, such as a smartphone, tablet, or personal computer). The input data may include one or more user gestures directed to the user device 110b, such as a touchscreen input, mouse click, or key press. The input data may further be or include input audio 12. The device(s) 110a/110b may output audio 14a/14b corresponding to the output data.

The user device 110 may, in some embodiments, receive input audio 12 and may transduce it (using, e.g., a microphone) into corresponding audio data. As explained in further detail herein, the user device 110 may perform additional speech processing or may send the audio data to a remote system 120 for further audio processing via a network 199. Regardless of whether it is performed by the user device 110 or the remote system 120, an ASR component may process the audio data to determine corresponding text data, and an NLU component may process the text data to determine NLU data such as a domain, intent, or entity associated with the text data.

In various embodiments, the user device 110 or remote system 120 receives (130) input data representing words. The words may represent a news story, a book, an article in a newspaper or a magazine, or any other such input data representing words. The input data may directly represent words of the text, such as ACSII data representing the words, or may be a representation of sub-word or sub-syllable sounds (herein referred to as "phonemes") representing the words. The input data may further include metadata corresponding to the text, such as locations of word boundaries, sentence boundaries, or paragraph boundaries.

The user device 110 or remote system 120 may then process (132) the input data to determine a first prosody of the input data. As described in greater detail herein, a first prosody prediction component may process the input data (e.g., text input data) to determine first prosody embedding data for a first hierarchy level (e.g., sentence-level hierarchy, paragraph-level hierarchy, or chapter-level hierarchy) that represents the prosody of the input data at that level of hierarchy. If the first level of hierarchy is sentence-level hierarchy, for example, the first prosody embedding data may represent the emotion, speech rate, or mood of the sentence.

The user device 110 or remote system 120 may then process (134) a subset of the input data (e.g., a second, more granular hierarchy level, such as word-level hierarchy) to determine a second prosody for the subset. For example, if the first level of hierarchy is sentence-level hierarchy and the second level of hierarchy is word-level hierarchy, the second prosody embedding data may represent emphasis, loudness, or timbre of a word taking into account the determined first, sentence-level prosody embedding data. The first prosody prediction component may process the subset of the input data to determine second prosody embedding data for a second hierarchy level (e.g., phoneme-level hierarchy, word level-hierarchy, or sentence-level hierarchy) that represents the prosody of the subset of the input data at that level of hierarchy.

The user device 110 or remote system 120 may then process (136) the input data (e.g., the text input data) using an encoder, such as a phoneme encoder, to determine a representation of the words, which may be third embedding data. The input data may be a sequence of phonemes representing speech, wherein phonemes represent syllable-level or sub-syllable level sounds of words in the input data. The word "Alexa," may comprise three syllables "A-lex-a," and six phonemes "Ah," "le," "uh," "kah," "ess," "ah." A trained model, such as grapheme-to-phoneme model, may process ASCII text (or another similar representation of text) to determine the phonemes. The phoneme encoder may process the phonemes to determine the third embedding data, which may be data such as a vector of values that uniquely represents a particular sequence of phonemes.

The user device 110 or remote system 120 may then determine (138), using a speech decoder, audio data representing synthesized speech corresponding to the subset, the first prosody, and the second prosody. As described herein, the third embedding data represents the phonemes of the synthesized speech, while the first embedding data represents the predicted prosody of the synthesized speech at the first hierarchy level, and the second embedding data represents the predicted prosody at the second hierarchy level.

Referring to FIG. 1B, the components described herein (such as the first component, second component, encoder, or decoder) may be trained using training data comprising audio data representing speech and text data corresponding to the speech. The user device 110 or remote system 120 may thus receive (140) input training data representing text and may receive (142) first audio data representing speech corresponding to the text. The user device 110 or remote system 120 may process (144) the first audio data (using, e.g., a first prosody encoder) to determine first embedding data corresponding to a first prosody (at, for example, a first level of hierarchy) of the first audio data.

The user device 110 or remote system 120 may also process (146) the first embedding data and a subset of the first audio data to determine second embedding data corresponding to the first prosody and a second prosody of the subset (at, e.g., a second level of hierarchy). The user device 110 or remote system 120 may process the input data with a phoneme encoder to determine third embedding data representing the text. The user device 110 or remote system 120 may further process the first, second, and third embedding data using a speech decoder to determine second audio data representing synthesized speech corresponding to the subset. The components described herein may be trained by comparing the first audio data and the second audio data (using, for example, a first loss function that determines the differences therebetween), determining changes in values of the components (such as changes to neural network weights or offsets) as determined by an algorithm, such as a gradient descent algorithm, and then propagating the changes through the components. A second loss function may similarly be used to compare the prosody embedding data determined by the prosody encoder and the prosody embedding data determined by the prosody prediction component, described above with reference to FIG. 1A. The prosody prediction component may be similarly modified to have updated node weights or offsets to minimize the second loss function such that it produces the same or similar output when processing the input text data as does the prosody encoder when processing corresponding audio input data.

Referring to FIGS. 2A and 2B, a speech synthesis component 270 may process input data (e.g., text data) to determine audio output data representing synthesized speech corresponding to the text data. A speech synthesis training component 272 may process input training data (e.g., audio data representing speech and text data corresponding to the speech) to train the speech-synthesis component 270 or speech-synthesis training component 272 to determine synthesized speech in accordance with predicted prosody. Each of the speech synthesis component 270 and the speech synthesis training component 272 are described in greater detail herein and with reference to FIGS. 3A, 3B, 4A-4D, 5A-5C, 6, and 7A-7C.

Referring to FIG. 2A, the user device 110 may capture audio that includes speech and then either process the audio itself or transmit audio data representing the audio to the remote system 120 for further processing. The remote system 120 may have access to greater computing resources, such as more or faster computer processors, than does the user device, and may thus be able to process the audio data and determine corresponding output data faster than the user device. The user device 110 may have, a wakeword-determination component 222 that detects presence of a wakeword in audio and transmits corresponding audio data to the remote system only when (or after) the wakeword is detected. As used herein, a "wakeword" is one or more particular words, such as "Alexa," that a user of the user device may utter to cause the user device to begin processing the audio data, which may further include a representation of a command, such as "turn on the lights."

Referring also to FIG. 2B, the speech-processing system, including the speech synthesis component 270 and the speech synthesis training component 272 may disposed wholly on the user device 110. In other embodiments, some additional components, such as an ASR component, are disposed on the user device 110, while other components are disposed on the remote system 120. Any distribution of the components of the speech-processing system of the present disclosure is, thus, within the scope of the present disclosure. The discussion herein thus pertains to both the distribution of components of FIGS. 2A and 2B and also to similar distributions.

The user device 110 or remote system 120 may further include an automatic speech-recognition (ASR) component that processes the audio data to determine corresponding text data and a natural-language understanding (NLU) component that processes the text data to determine the intent of the user expressed in the text data and thereby determine an appropriate response to the intent. The remote system 120 may determine and transmit data representing the response to the user device 110 (or other device), which may then output the response.

Before processing the audio data, the device 110 may use various techniques to first determine whether the audio data includes a representation of an utterance of the user 10. For example, the user device 110 may use a voice-activity detection (VAD) component 222 to determine whether speech is represented in the audio data based on various quantitative aspects of the audio data, such as the spectral slope between one or more frames of the audio data, the energy levels of the audio data in one or more spectral bands the signal-to-noise ratios of the audio data in one or more spectral bands or other quantitative aspects. In other examples, the VAD component 222 may be a trained classifier configured to distinguish speech from background noise. The classifier may be a linear classifier, support vector machine, or decision tree. In still other examples, hidden Markov model (HMM) or Gaussian mixture model (GMM) techniques may be applied to compare the audio data to one or more acoustic models in speech storage; the acoustic models may include models corresponding to speech, noise (e.g., environmental noise or background noise), or silence.

If the VAD component 222 is being used and it determines the audio data includes speech, the wakeword-detection component 220 may only then activate to process the audio data to determine if a wakeword is likely represented therein. In other embodiments, the wakeword-detection component 220 may continually process the audio data (in, e.g., a system that does not include a VAD component.) The user device 110 may further include an ASR component for determining text data corresponding to speech represented in the input audio 12 and may send this text data to the remote system 120.

The trained model(s) of the VAD component 222 or wakeword-detection component 220 may be CNNs, RNNs, acoustic models, hidden Markov models (HMMs), or classifiers. These trained models may apply general large-vocabulary continuous speech recognition (LVCSR) systems to decode the audio signals, with wakeword searching conducted in the resulting lattices or confusion networks. Another approach for wakeword detection builds HMMs for each key wakeword word and non-wakeword speech signals respectively. The non-wakeword speech includes other spoken words, background noise, etc. There may be one or more HMMs built to model the non-wakeword speech characteristics, which may be referred to as filler models. Viterbi decoding may be used to search the best path in the decoding graph, and the decoding output is further processed to make the decision on wakeword presence. This approach can be extended to include discriminative information by incorporating a hybrid DNN-HMM decoding framework. In another example, the wakeword-detection component may use convolutional neural network (CNN)/recursive neural network (RNN) structures directly, without using a HMM. The wakeword-detection component may estimate the posteriors of wakewords with context information, either by stacking frames within a context window for a DNN, or using a RNN. Follow-on posterior threshold tuning or smoothing may be applied for decision making.

The remote system 120 may be used for additional audio processing after the user device 110 detects the wakeword or speech, potentially begins processing the audio data with ASR or NLU, or sends corresponding audio data 212. The remote system 120 may, in some circumstances, receive the audio data 212 from the user device 110 (or other devices or systems) and perform speech processing thereon. Each of the components illustrated in FIGS. 2A and 2B may thus be disposed on either the user device 110 or the remote system 120. The remote system 120 may be disposed in a location different from that of the user device 110 (e.g., a cloud server) or may be disposed in the same location as the user device 110 (e.g., a local hub server).

The audio data 212 may be sent to, for example, an orchestrator component 230 of the remote system 120. The orchestrator component 230 may include memory and logic that enables the orchestrator component 230 to transmit various pieces and forms of data to various components of the system 120. An ASR component 250, for example, may first transcribe the audio data into text data representing one more hypotheses corresponding to speech represented in the audio data 212. The ASR component 250 may transcribe the utterance in the audio data based on a similarity between the utterance and pre-established language models. For example, the ASR component 250 may compare the audio data with models for sounds (which may include, e.g., subword units, such as phonemes) and sequences of sounds represented in the audio data to identify words that match the sequence of sounds spoken in the utterance. These models may include, for example, one or more finite state transducers (FSTs). An FST may include a number of nodes connected by paths. The ASR component 250 may select a first node of the FST based on a similarity between it and a first subword unit of the audio data. The ASR component 250 may thereafter transition to second and subsequent nodes of the FST based on a similarity between subsequent subword units and based on a likelihood that a second subword unit follows a first.

After determining the text data, the ASR component 250 may send (either directly or via the orchestrator component 230) the text data to a corresponding NLU component 260. The text data output by the ASR component 260 may include a top-scoring hypothesis or may include an N-best list including multiple hypotheses (e.g., a list of ranked possible interpretations of text data that represents the audio data). The N-best list may additionally include a score associated with each hypothesis represented therein. Each score may indicate a confidence of ASR processing performed to generate the hypothesis with which it is associated.

The NLU component 260 may process the text data to determine a semantic interpretation of the words represented in the text data. That is, the NLU component 260 determines one or more meanings associated with the words represented in the text data based on individual words represented in the text data. The meanings may include a domain, an intent, and one or more entities. As those terms are used herein, a domain represents a general category associated with the command, such as "music" or "weather." An intent represents a type of the command, such as "play a song" or "tell me the forecast for tomorrow." An entity represents a specific person, place, or thing associated with the command, such as "Toto" or "Boston." The present disclosure is not, however, limited to only these categories associated with the meanings (referred to generally herein as "natural-understanding data," which may include data determined by the NLU component 260 or the dialog manager component.)

The NLU component 260 may determine an intent (e.g., an action that the user desires the user device 110 or remote system 120 to perform) represented by the text data or pertinent pieces of information in the text data that allow a device (e.g., the device 110, the system 120, etc.) to execute the intent. For example, if the text data corresponds to "play Africa by Toto," the NLU component 260 may determine that a user intended the system to output the song Africa performed by the band Toto, which the NLU component 260 determines is represented by a "play music" intent. The NLU component 260 may further process the speaker identifier 214 to determine the intent or output. For example, if the text data corresponds to "play my favorite Toto song," and if the identifier corresponds to "Speaker A," the NLU component may determine that the favorite Toto song of Speaker A is "Africa."

The user device 110 or remote system 120 may include one or more skills 290. A skill 290 may be software such as an application. That is, the skill 290 may enable the user device 110 or remote system 120 to execute specific functionality in order to provide data or produce some other output requested by the user 10. The user device 110 or remote system 120 may be configured with more than one skill 290. For example, a speech-configuration skill may enable use of the speech-parameter determination component 202, encoded data determination component 204, speech synthesis component 270, and the speech parameter visualization component 206 described herein.

In some instances, a skill 290 may provide output text data responsive to received NLU results data. The device 110 or system 120 may include a speech synthesis component 270 that generates output audio data from input text data or input audio data and the encoded data. The speech synthesis component 270 may use one of a variety of speech-synthesis techniques. In one method of synthesis called unit selection, the speech synthesis component 270 analyzes text data against a database of recorded speech. The speech synthesis component 270 selects units of recorded speech matching the text data and concatenates the units together to form output audio data. In another method of synthesis called parametric synthesis, the speech synthesis component 270 varies parameters such as frequency, volume, and noise to create output audio data including an artificial speech waveform. Parametric synthesis uses a computerized voice generator, sometimes called a vocoder. In another method of speech synthesis, a trained model, which may be a sequence-to-sequence model, directly generates output audio data based on the input text data.

The user device 110 or remote system 120 may include a speaker-recognition component 295. The speaker-recognition component 295 may determine scores indicating whether the audio data 212 originated from a particular user or speaker. For example, a first score may indicate a likelihood that the audio data 212 is associated with a first synthesized voice and a second score may indicate a likelihood that the speech is associated with a second synthesized voice. The speaker recognition component 295 may also determine an overall confidence regarding the accuracy of speaker recognition operations. The speaker recognition component 295 may perform speaker recognition by comparing the audio data 212 to stored audio characteristics of other synthesized speech. Output of the speaker-recognition component 295 may be used to inform NLU processing as well as processing performed by the speechlet 290.

The user device 110 or remote system 120 may include a profile storage 275. The profile storage 275 may include a variety of information related to individual users or groups of users who interact with the device 110. The profile storage 275 may similarly include information related to individual speakers or groups of speakers that are not necessarily associated with a user account.

Each profile may be associated with a different user or speaker. A profile may be specific to one user or speaker or a group of users or speakers. For example, a profile may be a "household" profile that encompasses profiles associated with multiple users or speakers of a single household. A profile may include preferences shared by all the profiles encompassed thereby. Each profile encompassed under a single profile may include preferences specific to the user or speaker associated therewith. That is, each profile may include preferences unique from one or more user profiles encompassed by the same user profile. A profile may be a stand-alone profile or may be encompassed under another user profile. As illustrated, the profile storage 275 is implemented as part of the remote system 120. The profile storage 275 may, however, may be disposed on the user device 110 or in a different system in communication with the user device 110 or system 120, for example over the network 199. The profile data may be used to inform speech processing.

Each profile may include information indicating various devices, output capabilities of each of the various devices, or a location of each of the various devices 110. This device-profile data represents a profile specific to a device. For example, device-profile data may represent various profiles that are associated with the device 110, speech processing that was performed with respect to audio data received from the device 110, instances when the device 110 detected a wakeword, etc. In contrast, user- or speaker-profile data represents a profile specific to a user or speaker.

Figure 3B:
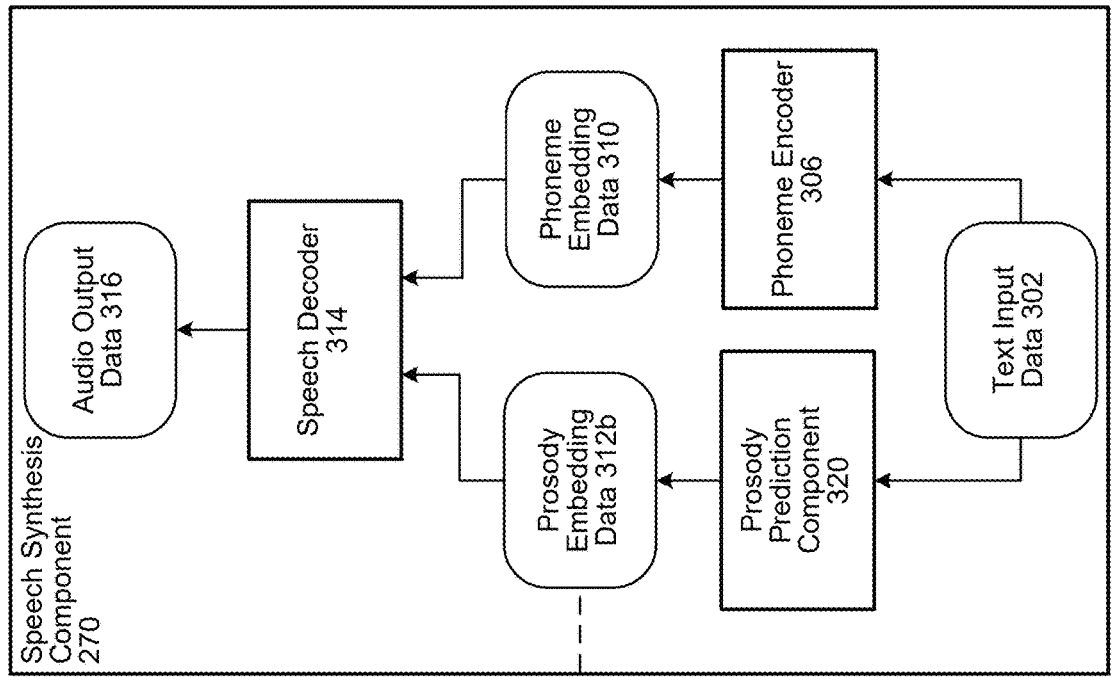
FIGS. 3A and 3B illustrate components for synthesizing audio data by processing input data according to embodiments of the present disclosure.
Figure 3A:
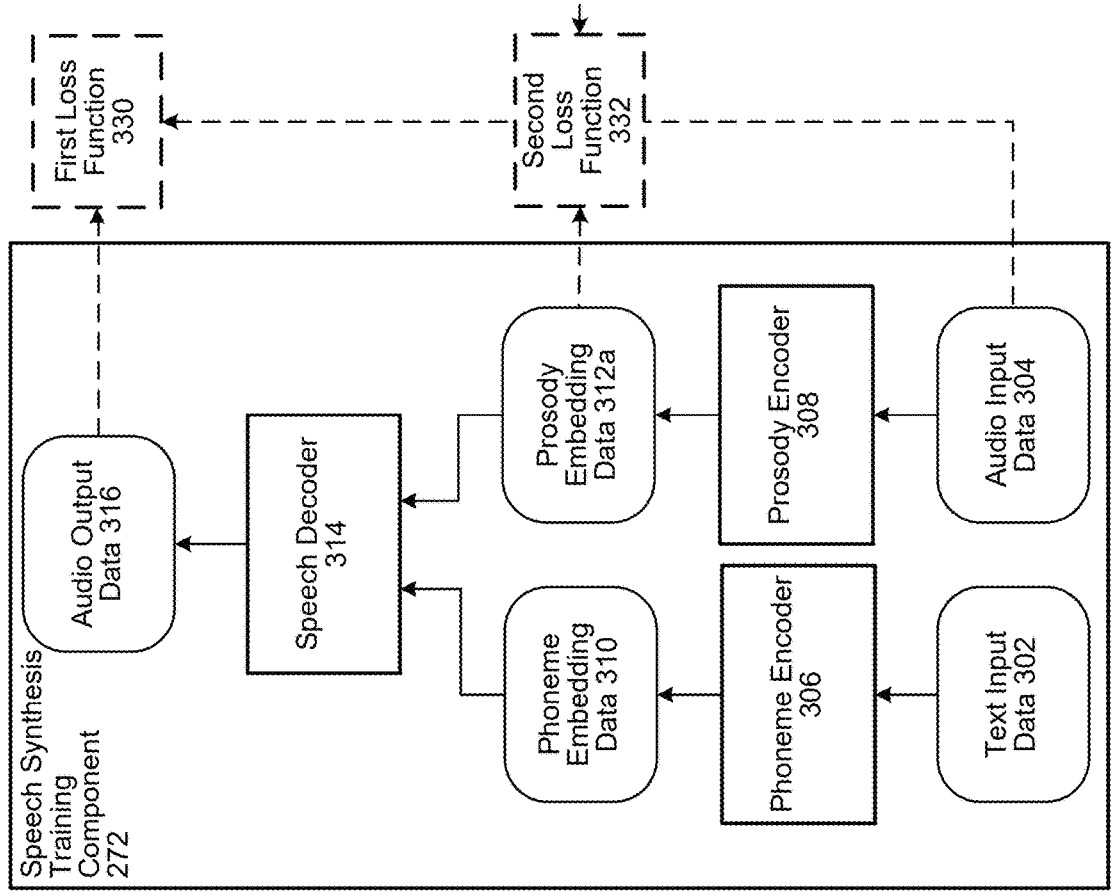

FIGS. 3A and 3B illustrate components for synthesizing audio data representing speech according to embodiments of the present disclosure. Referring first to FIG. 3A, a speech synthesis training component 272 may include a phoneme encoder 306 processes text input data 302 to determine phoneme embedding data 310. The phoneme encoder 306 may be a neural network and may process the text input data 302, which may be a sequence of phonemes representing text, to determine the phoneme embedding data 310, which may be a vector of N values that represents the sequence. If the text input data 302 is a sequence of phonemes representing a word, for example, the phoneme embedding data 310 may be a vector of values that uniquely represents the word. Similarly, if the text input data 302 is a sequence of phonemes representing a sentence, paragraph, chapter, or book, the phoneme embedding data 310 may be a vector of values that uniquely represents the sentence, paragraph, chapter, or book. The phoneme embedding data 310 may thus correspond to a point in an embedding space corresponding to the text input data 302, wherein the embedding space is an N-dimensional space representing all possible words, sentences, paragraphs, chapters, or books. Points near each other in the embedding space may represent similar items of text input data 302, while points far from each other in the embedding space may represent dissimilar items of text input data 302.

A prosody encoder 308 may process audio input data 304 to determine prosody embedding data 312a. The audio input data 304 may correspond to the text input data 302; that is, the audio input data 304 may include a representation of spoken words, and the text input data 302 may include a textual representation of the same words. The prosody embedding data 312a may represent prosody of the audio input data at multiple levels of hierarchy, such as both word-level hierarchy and sentence-level hierarchy. The prosody encoder 308 is described in greater detail herein with reference to FIGS. 4A-4D.

A speech decoder 314 may process both the phoneme embedding data 310 and the prosody embedding data 312b to determine audio output data 316. The audio output data 316 may include a representation of synthesized speech that corresponds to words in the text input data 302 as well as prosody represented in the prosody embedding data 312. In some embodiments, the audio input data 304 or the audio output data 316 includes representations of spectrogram data, such as Mel-spectrogram data, that represents speech. The speech decoder 314 is described in greater detail below with reference to FIGS. 6 and 7A-7C.

Referring to FIG. 3B, the speech synthesis component 270 may similarly include a phoneme encoder 306 and a speech decoder 314. In lieu of the prosody encoder 308, however, the speech synthesis component 270 may include a prosody prediction component 320 that processes text input data 302 to determine the prosody embedding data 312. The prosody prediction component 320 is described in greater detail herein with reference to FIGS. 5A-5E.

The speech synthesis training component 272 may be trained using training data consisting of one or more items of text input data 302 and corresponding audio input data 304. The text input data 302 may include written content, such as the text of a book, and the corresponding audio input data 304 may include a representation of speech corresponding to the text. The speech synthesis training component 272 may process the text input data 302 and the audio input data 304 as described herein, and may generate corresponding audio output data 316. The audio input data 304 and the audio output data 316 may be compared in accordance with a first loss function 330 using, for example, a least-mean-squares function, to determine a difference therebetween. Values of nodes of the phoneme encoder 306, prosody encoder 308, or speech decoder 314 may be re-computed in accordance with an algorithm, such as a gradient descent algorithm, to reduce the difference between the audio input data 304 and the audio output data 316. This training process and re-computation of the node values may be repeated until the result of the first loss function 330 is zero or less than a threshold.

A second loss function 332 may be used to compare and determine the difference between the prosody embedding data 312a determined by the prosody encoder 308 and the prosody embedding data 312b determined by the prosody prediction component 320. The prosody prediction component 320 may be re-trained in accordance with the result of the second loss function 332 to minimize or eliminate a difference between the prosody embedding data 312a and the prosody embedding data 312b. The prosody prediction component 320 may thus be trained to determine the same or similar prosody embedding data 312b given the text input data as does the prosody encoder 308 given the audio input data 304.

Figure 4A:
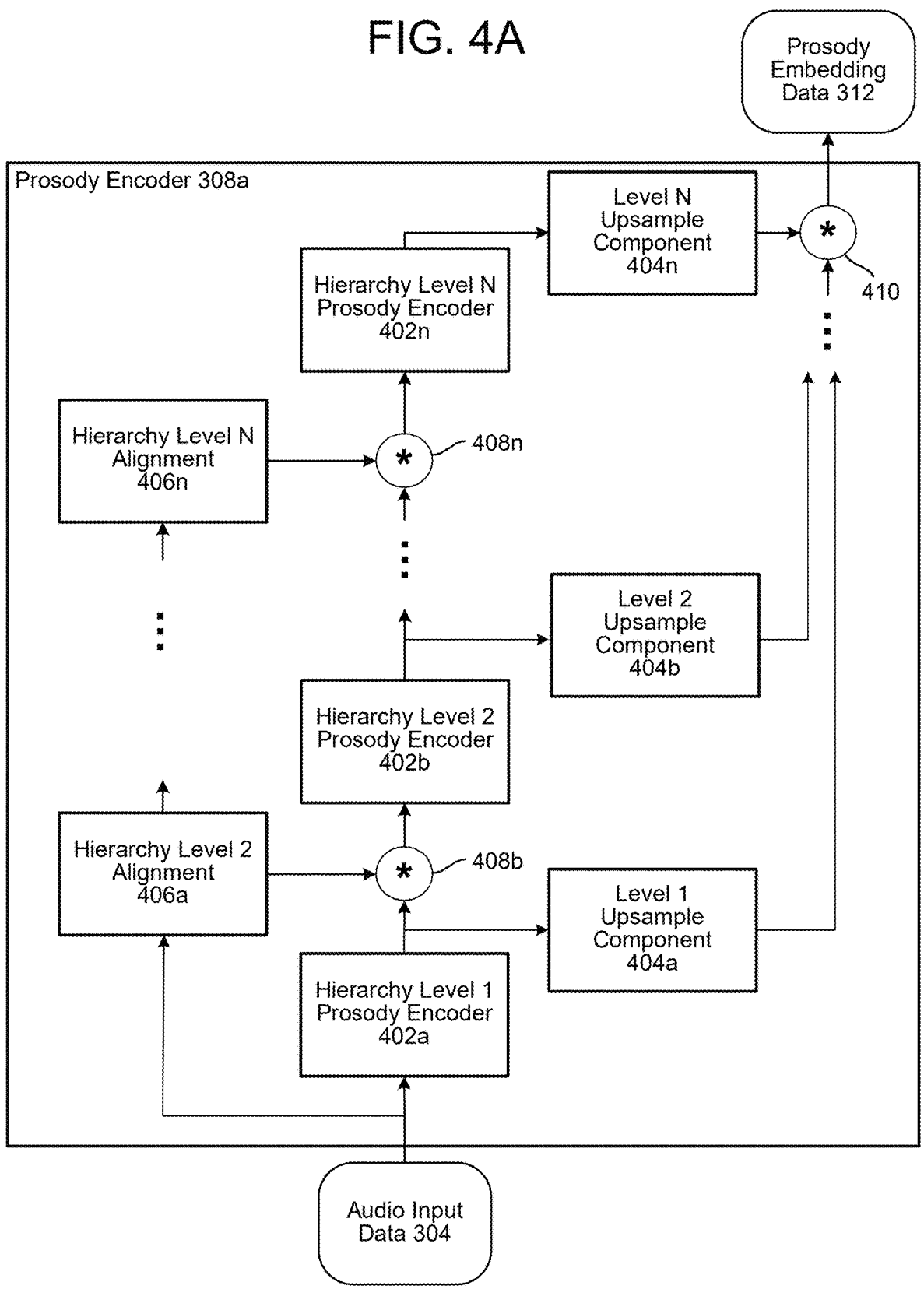
FIGS. 4A, 4B, 4C, and 4D illustrate components for prosody encoding according to embodiments of the present disclosure.

FIGS. 4A, 4B, 4C, and 4D illustrate components for prosody encoding according to embodiments of the present disclosure. Referring first to FIG. 4A, one or more prosody encoders 402 may process the audio input data 304 or outputs of other prosody encoders 402. Each prosody encoder 402, shown in greater detail with respect to FIG. 4D, may be a variational autoencoder (VAE). The output of each prosody encoder 402 may therefore be probability distribution corresponding to the likelihood that each dimension of the probability represents prosody of the audio input data 302. The output probability distribution may be sampled (in some embodiments, randomly sampled) to determine the prosody data.

In some embodiments, the sampling of the probability distribution may be adjusted in accordance with user input. A user 10 may, for example, change the sampling parameters (such as mu or sigma parameters) to thereby change the prosody in the audio output data 316. The user device 110 may, for example, cause output of audio corresponding to the audio output data 316, and the user 10 may input sampling parameters in response.

An upsampling component 404a may upsample the output of a prosody encoder 402a to match the granularity of at least one other prosody encoder 402. For example, if a first prosody encoder 402a determines sentence-level prosody, and a second prosody encoder 402b determines word-level prosody, the output of the sentence-level prosody encoder 402a may be upsampled using the first upsampling component 404a such that the output rate of the first upsampling component 404a matches that of the second prosody encoder 402b. The upsampling component 404a may duplicate the output of the prosody encoder 402a a number of times to match the higher sampling rate of a different prosody encoder 402b. When and if the output of the prosody encoder 402a changes, the upsampling component 404a may change its output to match that of the prosody encoder 402a gradually, for example in accordance with a moving average. The outputs of one or more of the upsampling components 404 may be combined using a concatenation component 410 to determine the prosody embedding data 312.

A prosody encoder 402 may receive the audio data 304 or a version of the audio data modified by one or more hierarchy alignment components 406. If, for example, the audio input data 304 corresponds to a first level of hierarchy (e.g., sentence-level hierarchy) and a prosody encoder 402b corresponds to a second, different level of hierarchy (e.g., word-level hierarch), a hierarchy alignment component 406 may divide the audio input data 304 into segments that each correspond to a word as represented in the audio input data 304. Hierarchy boundaries (e.g., word or sentence boundaries) may be indicated in the input text data 302 or may be determined by processing the audio input data 304 by, for example, identifying segments of the audio input data 304 corresponding to less loudness.

Concatenation elements 408 may combine one or more outputs of one or more prosody encoders 402 with some or all of the audio input data 304 (as modified, in some embodiments, by one or more hierarchy alignment components 406). Each prosody encoder 402 may thus receive, as input, some or all of the audio input data 304 as well as one or more outputs of one or more prosody encoders 402. In other words, each prosody encoder 402 may determine prosody data from not just the audio input data 304 at its level of hierarchy but also by processing prosody data from one or more levels of other hierarchy. Each concatenation element 408a, 408b, . . . 408n may upsample the output of a first prosody encoder 402 to match the sampling rate of the input of a second prosody encoder 402. For example, if the prosody encoder 402a is a sentence-level encoder and if the prosody encoder 402b is a word-level encoder, the concatenation element 408b may upsample the sentence sampling rate of the output of the first encoder 402a to the word sampling rate of the second encoder 402b.

Figure 4B:
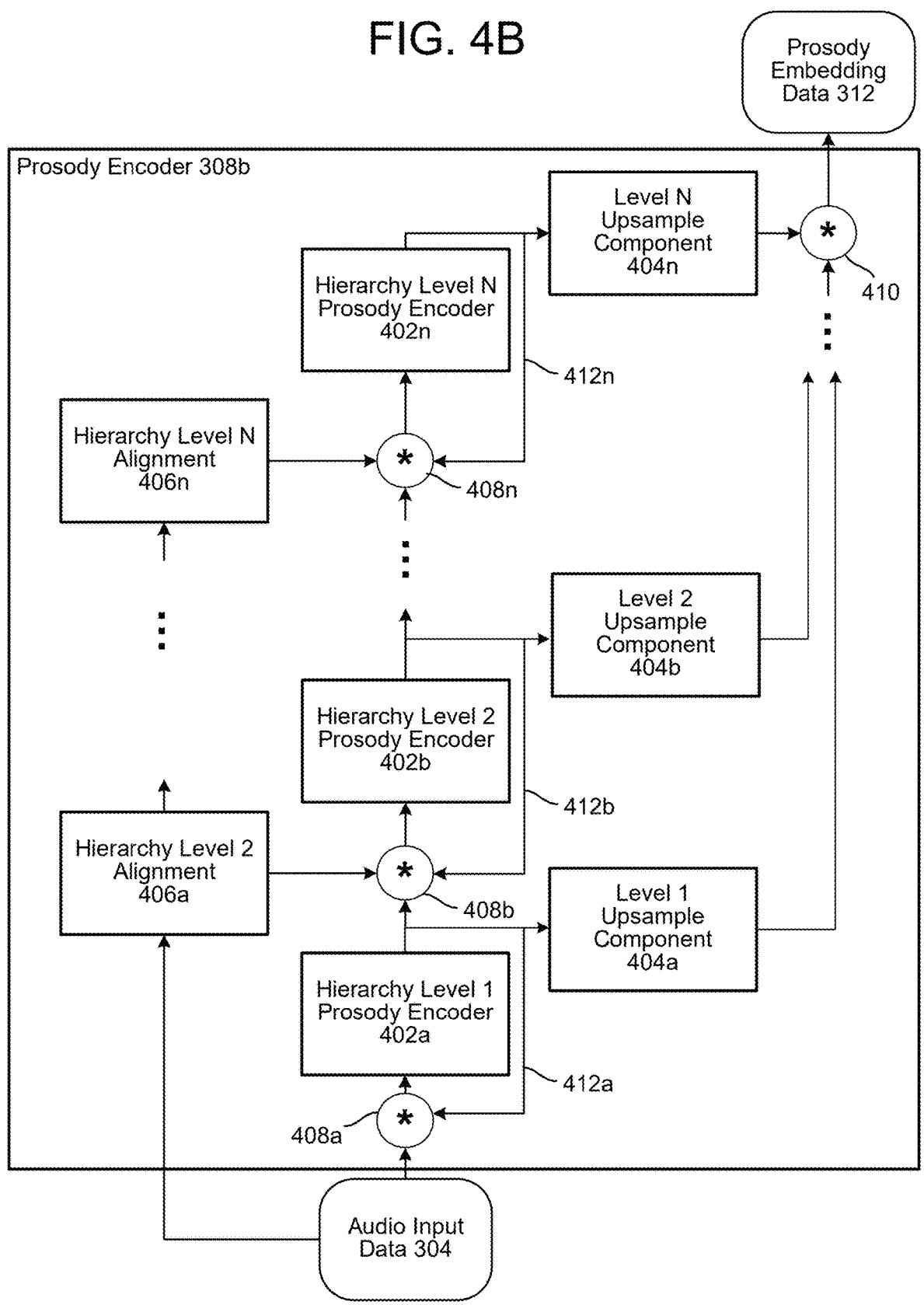

Referring to FIG. 4B, one or more of the prosody encoders 402 may receive feedback input 412 from its output to its corresponding concatenation component 408. The output of the given prosody encoder 402 may thus depend at least in part on not just the audio input data 304 or the outputs of one or more other prosody encoders 402, but also a prior output of the same prosody encoder 402. In other words, if a given prosody encoder 402 determines prosody embedding data 312 for a given level of hierarchy (e.g., word-level hierarchy), the determined prosody of a word may depend at least in part on one or more prior words represented in the audio input data 304. This dependency may thus reduce or eliminate large changes in the prosody from word to word.

As described herein, different levels of hierarchy of determined prosody may correspond to traditional grammatical units, such as words, sentences, paragraphs, or chapters. In other embodiments, however, the different levels of hierarchy may correspond to different unit sizes, such as one or more words or phonemes preceding or following a given word, one or more sentences preceding or following a given sentence, one or more paragraphs preceding or following a given paragraph, etc. In some embodiments, a level of hierarchy may correspond to subsections of another level of hierarchy, such as clauses or parentheticals appearing in a sentence.

In some embodiments, a level of hierarchy of the determined prosody corresponds to indications of speech in the text input data 302, such as speech by a character in a novel represented by the text input data 302. For example, if the text input data 302 includes a representation of the text, "John said 'Hello,'" a prosody encoder 308 may determine that the word "Hello" is spoken by a character named "John." The prosody encoder 308 may similarly determine which character corresponds to which speech by inferring which of two or more characters are speaking in a dialog. The output of the prosody encoder 308 may thus correspond to a prosody corresponding to each character, such that the audio output data 316 includes a representation of each "voice" for each character.

Figure 4C:
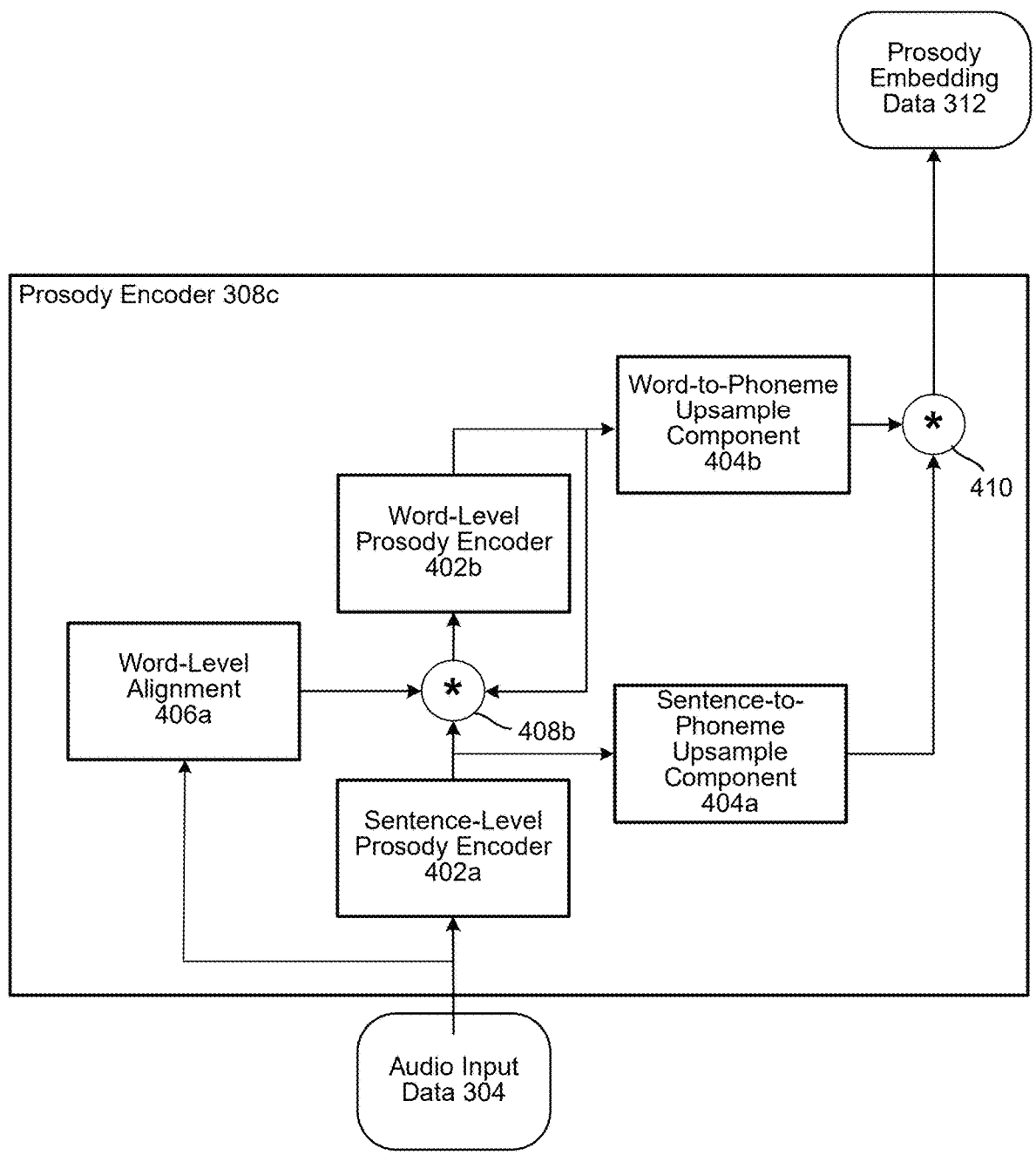

Referring to FIG. 4C, in some embodiments, a first prosody encoder may be a sentence-level prosody encoder 402a, and a second prosody encoder may be a word-level prosody encoder 402b. A word-level alignment component 406a may divide the sentence-level audio input data 304 into word-aligned segments. A first sentence-to-phoneme upsampling component 404a may upsample the sentence-level prosody embedding data to the rate of the phoneme data, and a second word-to-phoneme upsampling component 404b may upsample the word-level prosody embedding data to the rate of the phoneme data. The concatenation component 410 may thus combine the outputs of the sentence-to-phoneme upsampling component 404a and the word-to-phoneme upsampling component 404b to determine the prosody embedding data 312.

Figure 4D:
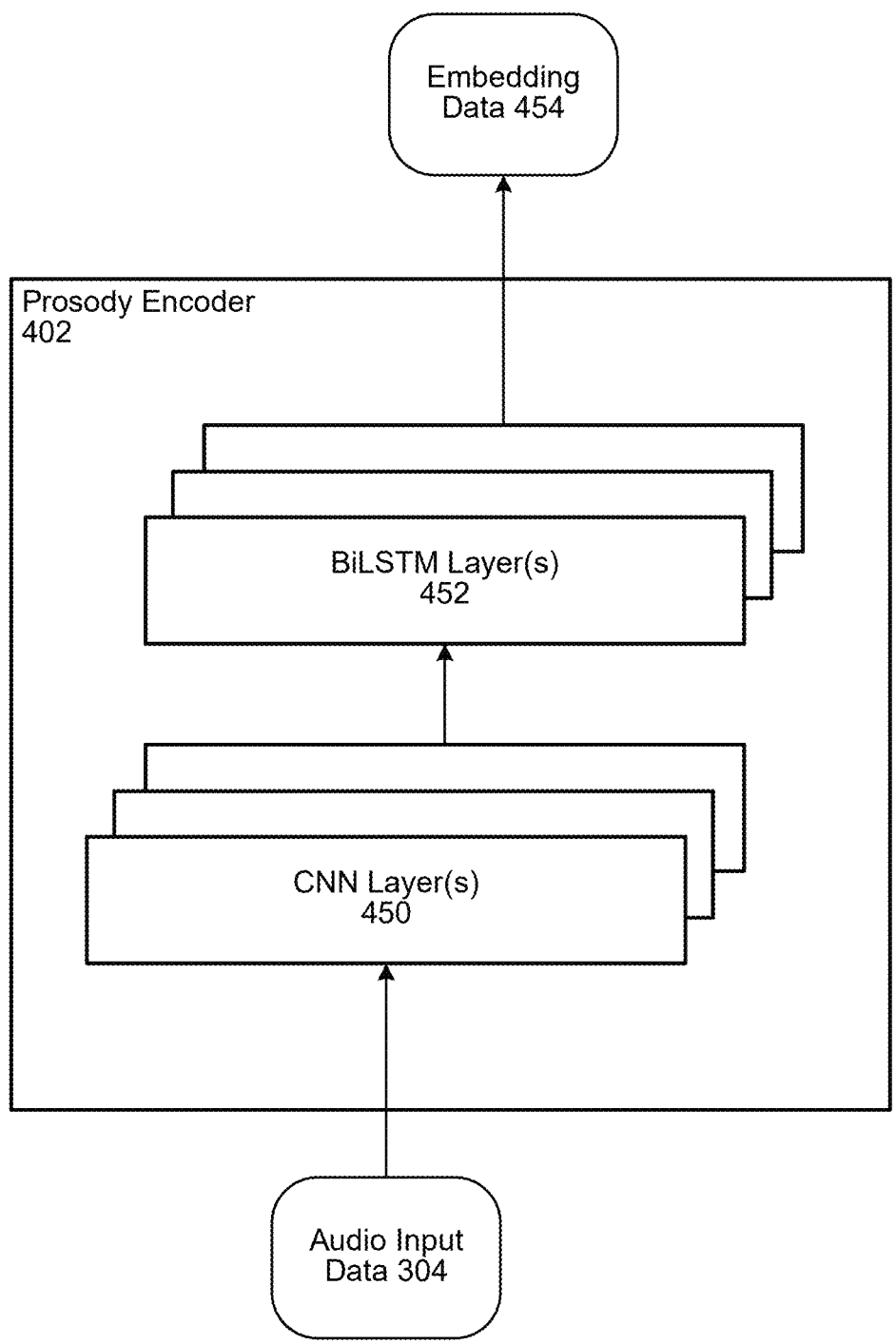

Referring to FIG. 4D, one embodiment of a prosody encoder 402 may include one or more convolutional neural network (CNN) layers 450 for processing input data (which may be the audio input data 304 or output data of other prosody encoders 402) and one or more bidirectional long short-term memory (BiLSTM) layers 452 for processing the output(s) of the CNN layers 450 to determine embedding data 454. In some embodiments, the prosody encoder 402 includes three CNN layers 450 and two BiLSTM layers 452. The present disclosure is not, however, limited to only these types and numbers of layers, and other deep neural network (DNN) or recurrent neural network (RNN) layers are within its scope.

Figure 5A:
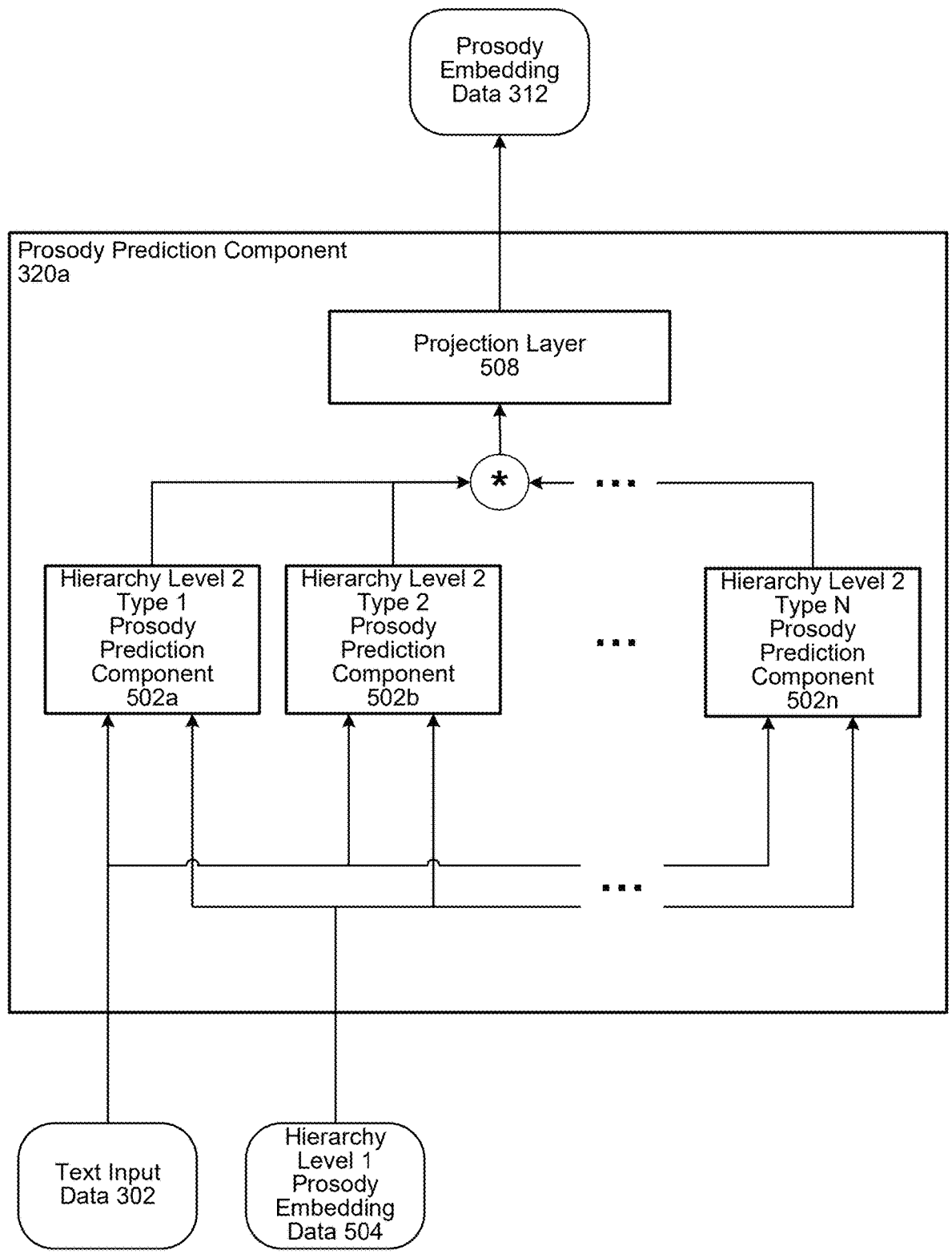

FIGS. 5A, 5B, 5C, and 5D illustrate components for prosody prediction according to embodiments of the present disclosure. Referring first to FIG. 5A, a prosody prediction component 320a may include one or more types of hierarchy-specific prosody prediction components 502. A first hierarchy-specific prosody prediction component 502a may correspond to syntax-based prosody, for example, while a second hierarchy-specific prosody prediction component 502b Each prosody prediction component 502 may process the text input data 302 or prosody embedding data 504 corresponding to one or more other levels of hierarchy. The prosody embedding data 504 may correspond to a different hierarchy than that of the prosody prediction component(s) 502; for example, the prosody embedding data 504 may correspond to sentence-level hierarchy while the prosody prediction component(s) 502 may correspond to word-level hierarchy. The prosody embedding data 504 may be determined by processing the text input data 302 at the corresponding level of hierarchy (e.g., combining or averaging outputs of the prosody prediction component(s) 502 for each word in a sentence) or by estimating the prosody embedding data 504 using a previously determined item of prosody embedding data 504 (corresponding to, e.g., a previously processed sentence).

Each hierarchy-specific prosody prediction component 502 may include one or more trained models that predict the prosody embedding data 312 given the input data. As described above, each of the hierarchy-specific prosody prediction component 502 may be trained using the second loss function 332 shown in FIGS. 3A and 3B. The prosody prediction component 320a may further include a projection layer component 508 for projecting the output(s) of the hierarchy-specific prosody prediction components 502, which may have an unknown dimension, onto the known dimension of the prosody embedding data 312 as required by the input of the speech decoder 314. The projection layer component 508 may perform upsampling, downsampling, interpolation, or averaging of the values of the outputs of the hierarchy-specific prosody prediction components 502 to change the dimension thereof.

FIG. 5B illustrates one embodiment of a prosody prediction component 320*b*. In this embodiment, a first level of hierarchy corresponds to sentence-level hierarchy, and a second level of hierarchy corresponds to word-level hierarchy. A first prosody prediction component 502*a* corresponds to syntax-based prosody, and a second prosody prediction component 502*b* corresponds to semantics-based prosody. A projection layer component 508 projects the outputs of the prosody prediction components 502*a*, 502*b* to determine the prosody embedding data 312. Each of these components is described in greater detail with reference to FIGS. 5C-5E. The present disclosure is not, however, limited to only these levels of hierarchy or to these types of prosody prediction components 502*a*, 502*b*.

Figure 5C:
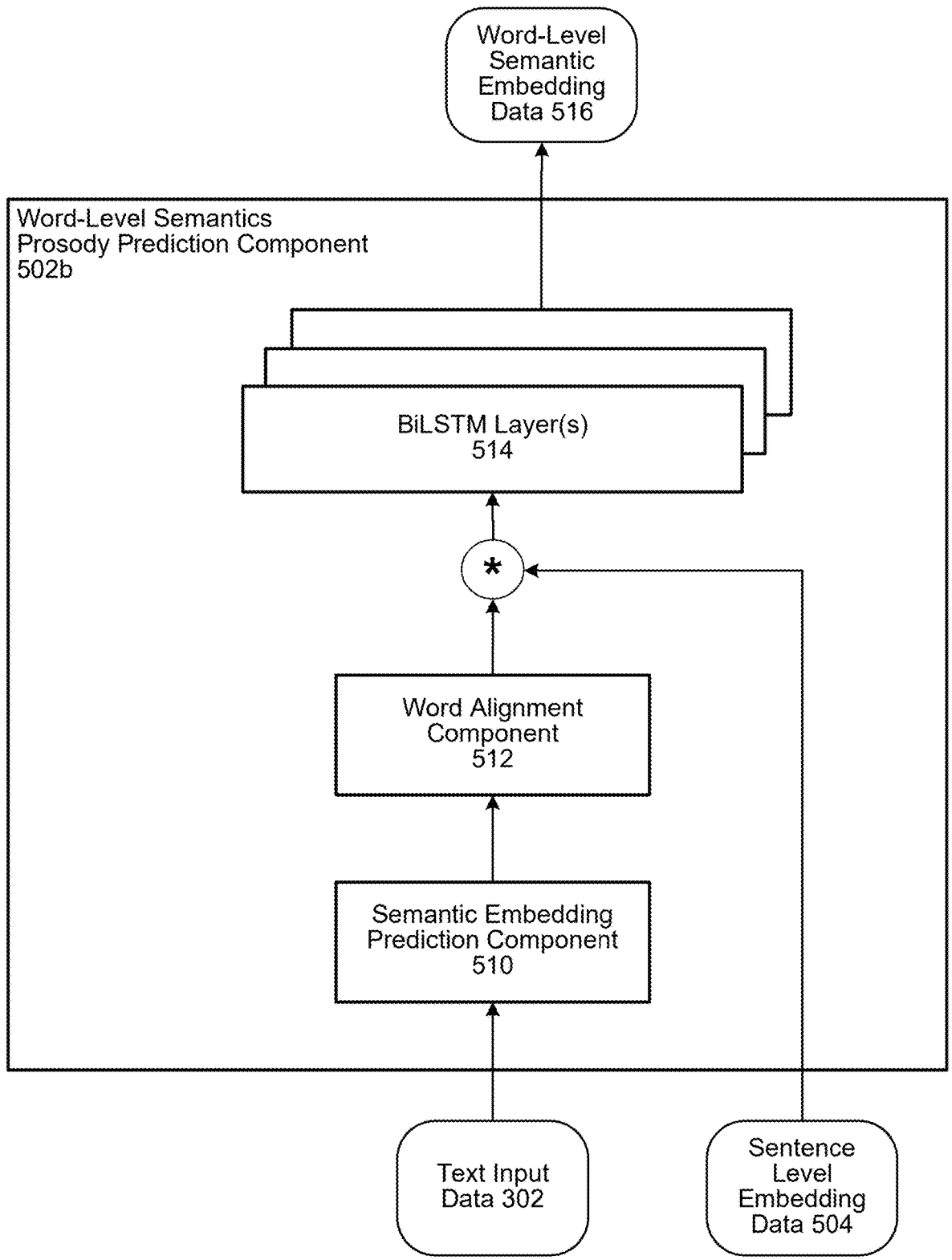

Referring to FIG. 5C, components of a word-level semantics prosody prediction component 502*b* are illustrated. A semantics embedding prediction component 510, which may be a trained model, may process the text input data 302 to determine semantics embedding data. The semantics embedding prediction component 510 may perform bidirectional encoder representations from transformers (BERT) processing. The semantics embedding data may be an N-dimensional vector defining a point in an embedding space; points corresponding to words or sentences having similar semantic meaning may be disposed near each other in the embedding space, while points corresponding to words or sentences having dissimilar semantic meaning may be disposed far from each other in the embedding space. Multiple items of semantics embedding data may correspond to a single word represented in the text input data 302; a word alignment component 512 may determine which items of semantics embedding data correspond to a particular word. The output of the word alignment component 512 may be concatenated with sentence-level embedding data 504 for processing by one or more BiLSTM layers 514 to produce the output word-level semantics embedding data 516.

Figure 5D:
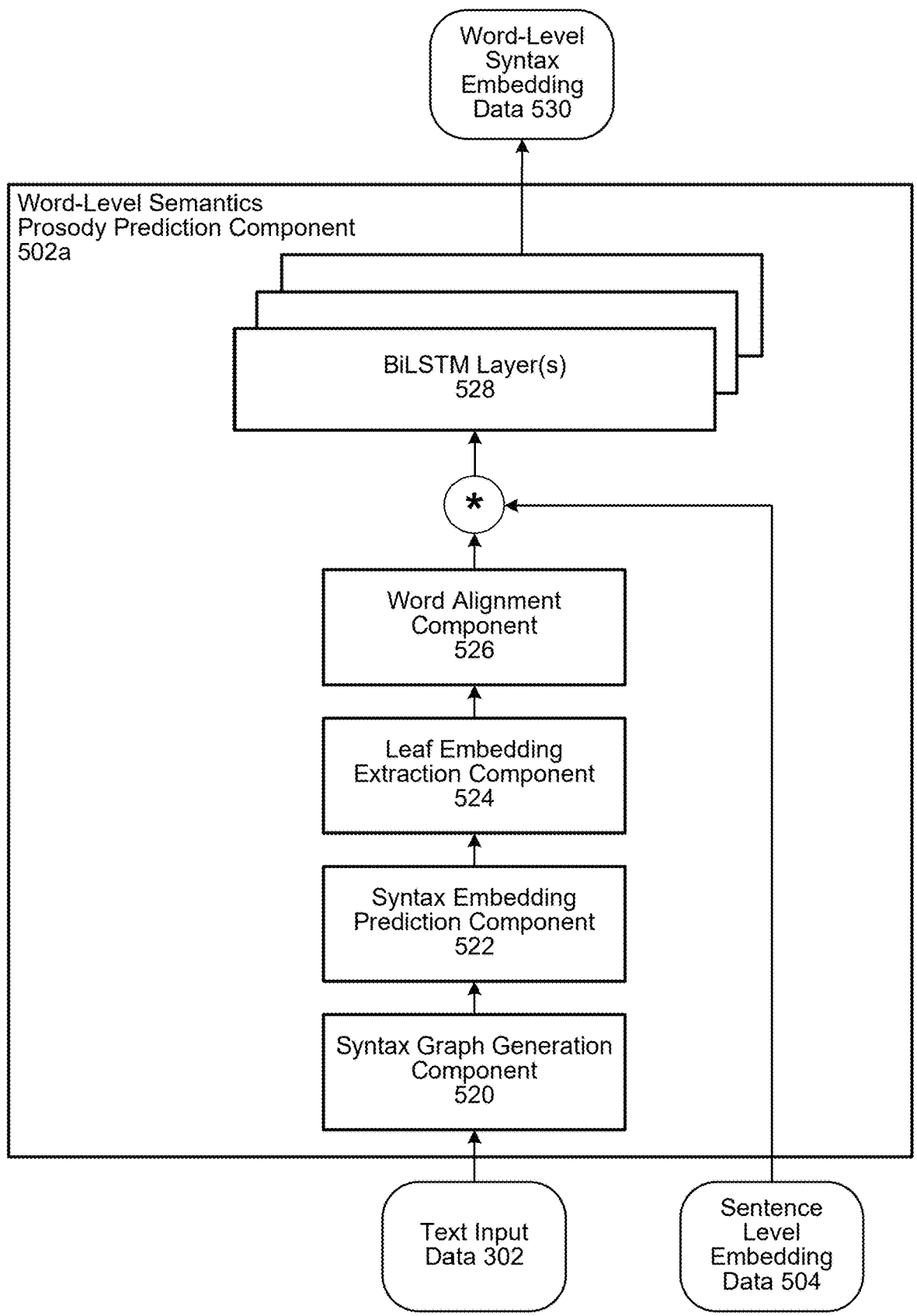
Figure 5E:
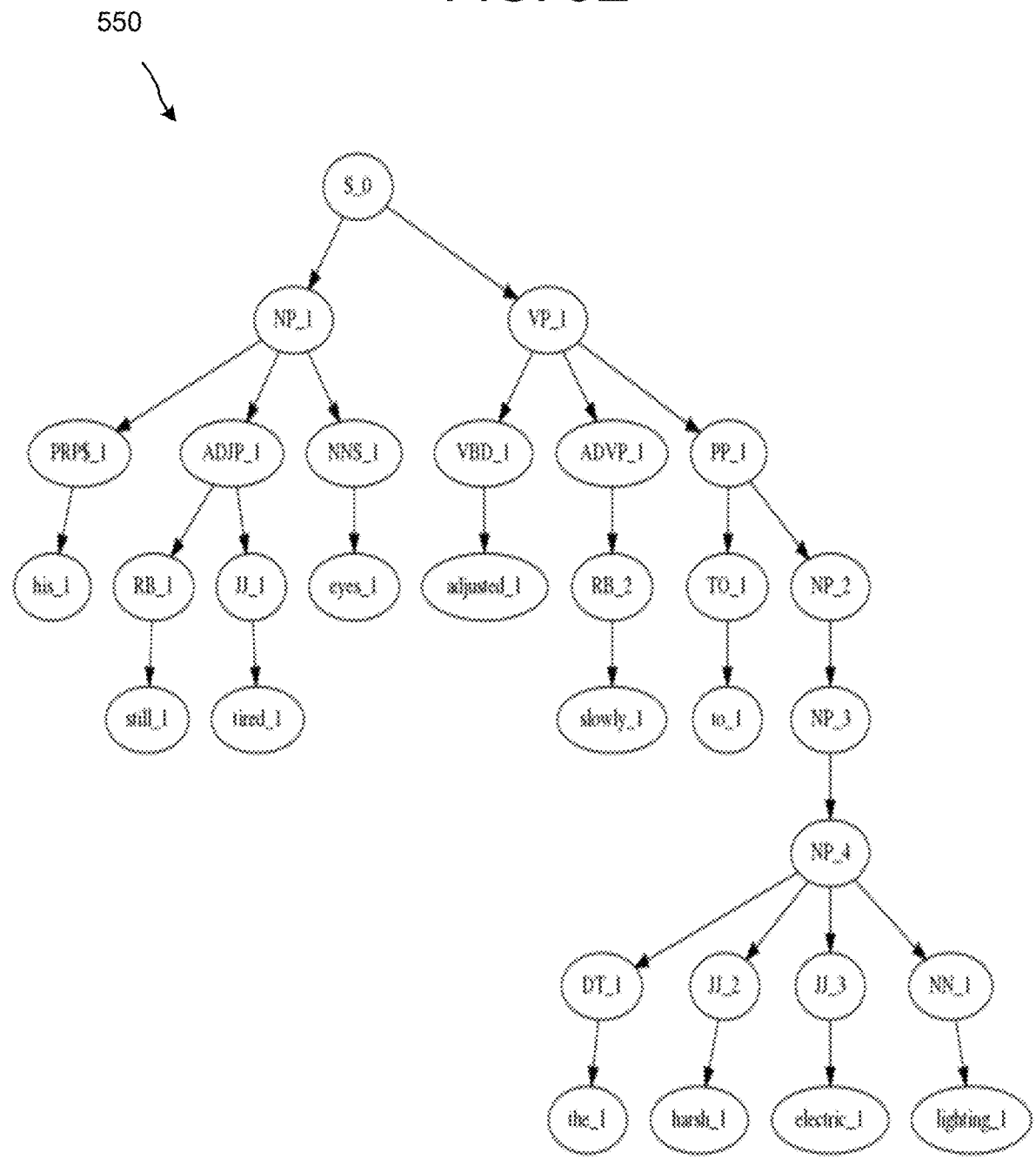
FIG. 5E illustrates a syntax graph according to embodiments of the present disclosure.

Referring to FIG. 5D, components of a word-level syntax prosody prediction component 502*a* are illustrated. A syntax graph generation component 520 may process the text input data 302 to determine a syntax graph, such as the syntax graph 550 of FIG. 5E. The syntax graph 550 may include words represented in the input text data 302 as leaves (e.g., nodes having no children); other nodes in the graph connecting the leaves may be labeled with syntax information corresponding to the use and placement of the word in a sentence. A syntax embedding prediction component 522 may process the syntax graph to determine corresponding embedding data, and a leaf embedding extraction component 524 may process the output of the syntax embedding prediction component 522 to determine embeddings specific to a certain leaf (e.g., word). A word alignment component 526 may determine which leaf embeddings correspond to a given word represented in the text input data 302. One or more BiLSTM layers may process the output of the word alignment component 526 and sentence-level embedding data 504 to determine word-level syntax embedding data 530.

Figure 6:
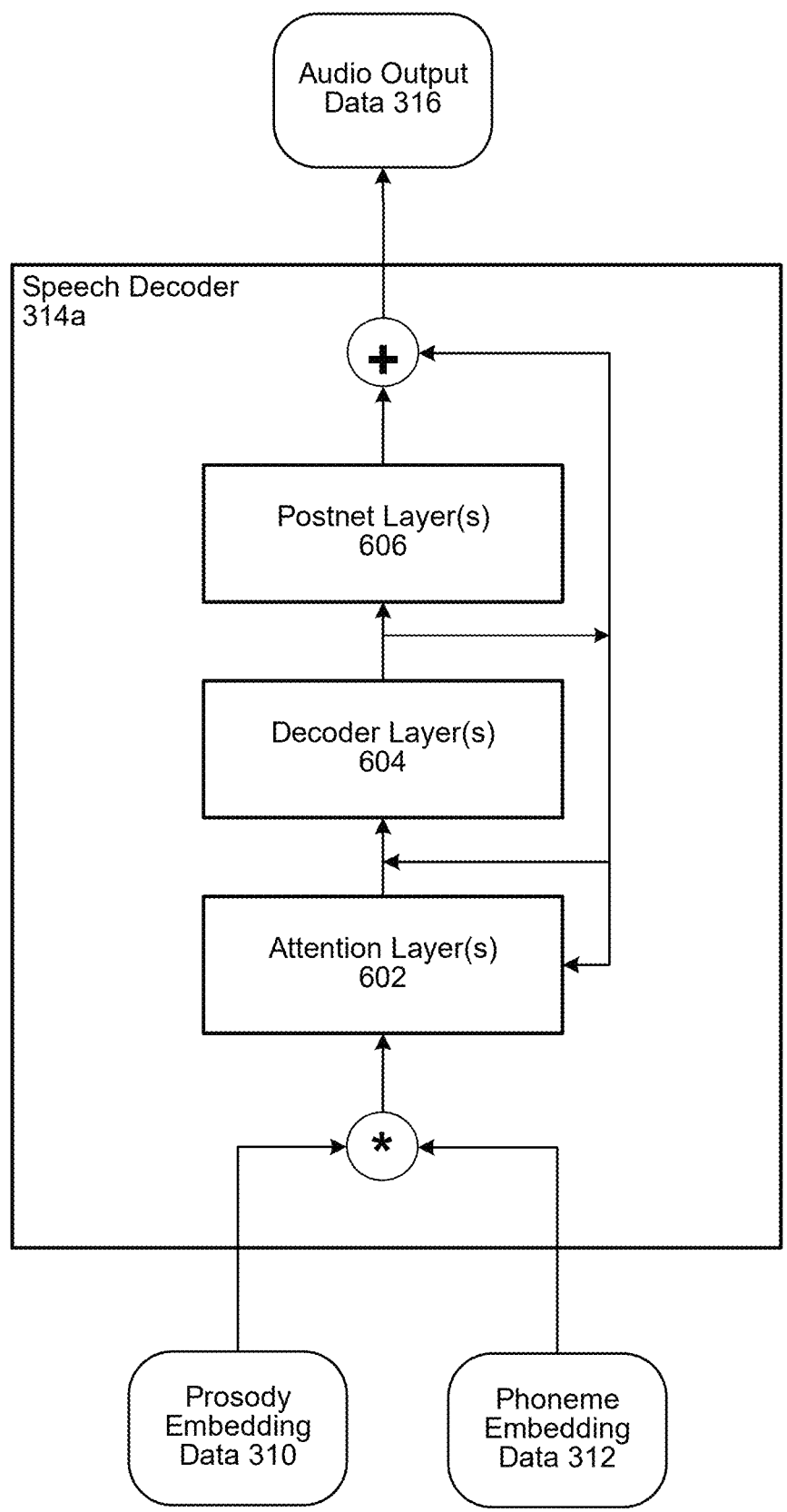
FIGS. 6 and 7A illustrate components of speech decoders according to embodiments of the present disclosure.
Figure 7A:
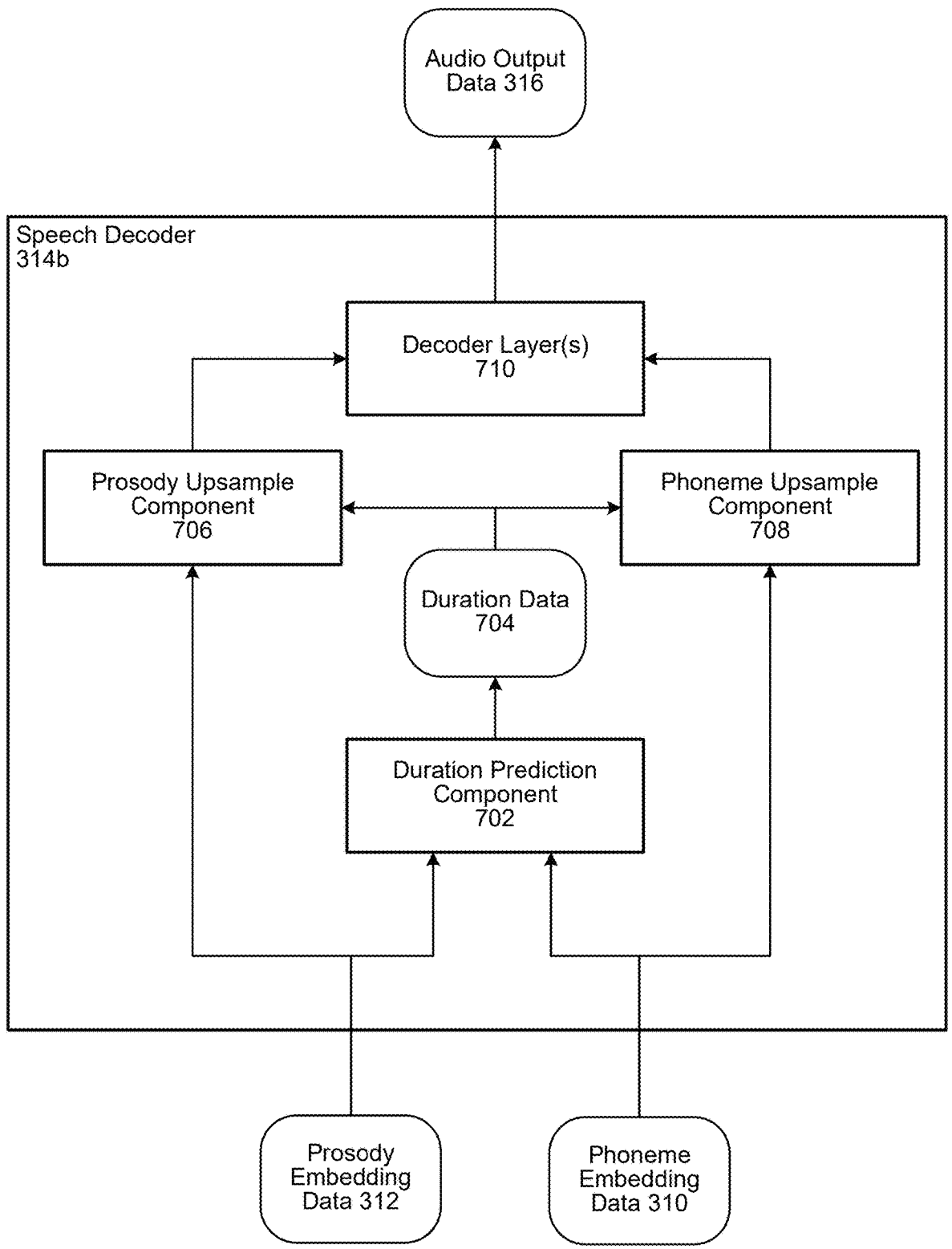

FIGS. 6 and 7A illustrate components of speech decoders according to embodiments of the present disclosure. Referring first to FIG. 6, the speech decoder 314*a* may include one or more decoder layer(s) 604, which may include one or more LSTM or BiLSTM layers. One or more attention layer(s) 602 may process input data, such as prosody embedding data 310 or phoneme embedding data 312, as well as one or more outputs of the decoder layer(s) 604. The attention layer(s) 602 may apply one or more weights to one or more of its inputs to thereby emphasize or "attend to" certain inputs over other inputs. One or more postnet layer(s) 606, such as linear projection, convolutional, and/or activation layers, may process the output(s) of the decoder layer(s) 604 to determine the audio output data 316.

Referring to FIG. 7A, a speech decoder 314*b* may include a duration prediction component 702 in lieu of the attention layer(s) 602. The duration prediction component 702, shown in greater detail in FIG. 7B, may process the prosody embedding data 312 and the phoneme embedding data 310 to determine duration data 704. The duration data 704 may indicate, for each item of prosody embedding data 312, a duration of time for which that item of prosody embedding data 312 should be processed against items of the phoneme embedding data 310. The prosody embedding data 312 may change more slowly than the phoneme embedding data 310 (e.g., a user 10 may utter two or more words using the same prosody), and thus an item of prosody embedding data 312 may be processed with multiple items of phoneme embedding data 310 for each duration.

The duration data 704 may be processed by a prosody upsample component 706 to upsample the prosody embedding data 312 and may be processed by a phoneme upsample component 708 to upsample the phoneme embedding data 310. For example, if a duration of time indicated by the duration data 704 corresponds to three items of phoneme embedding data 310, the prosody upsample component 706 may upsample a corresponding item of prosody embedding data 312 three times. The outputs of the prosody upsample component 706 and the phoneme upsample component 708 may be processed by decoder layers 710, as illustrated in FIG. 7C.

Figure 7B:
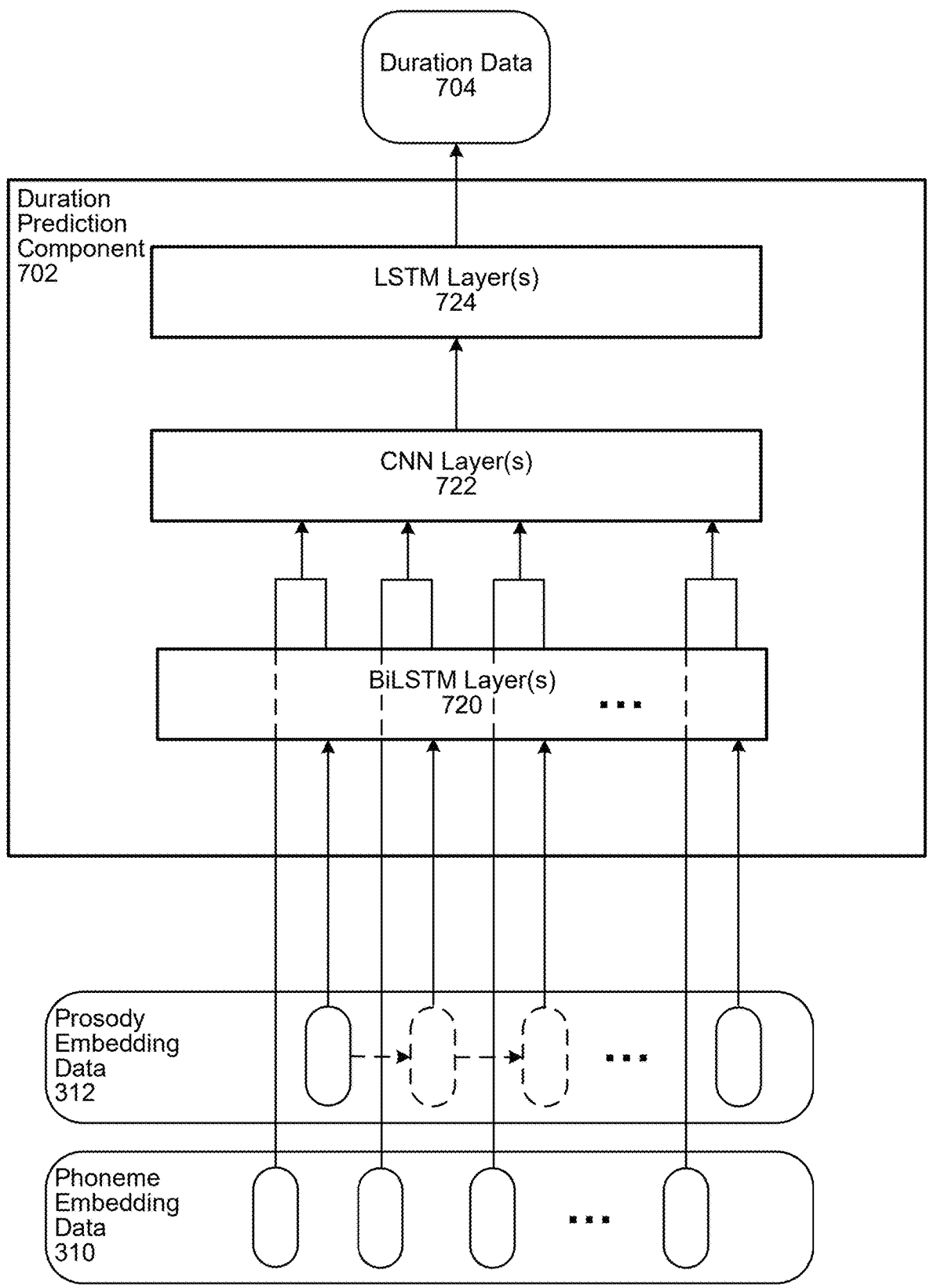
FIG. 7B illustrates components for duration prediction according to embodiments of the present disclosure.

FIG. 7B illustrates components of the duration prediction element 702 according to embodiments of the present disclosure. One or more BILSTM layer(s) 720 may process the prosody embedding data 312, and one or more CNN layer(s) 722 may process the phoneme embedding data 310 and the output of the BiLSTM layer(s) 720. One or more LSTM layer(s) 724 may process the output(s) of the CNN layer(s) to determine the duration data 704. In some embodiments, the duration prediction element 702 includes one BiLSTM layer 720, three CNN layers 722, and one LSTM layer 724.

Figure 7C:
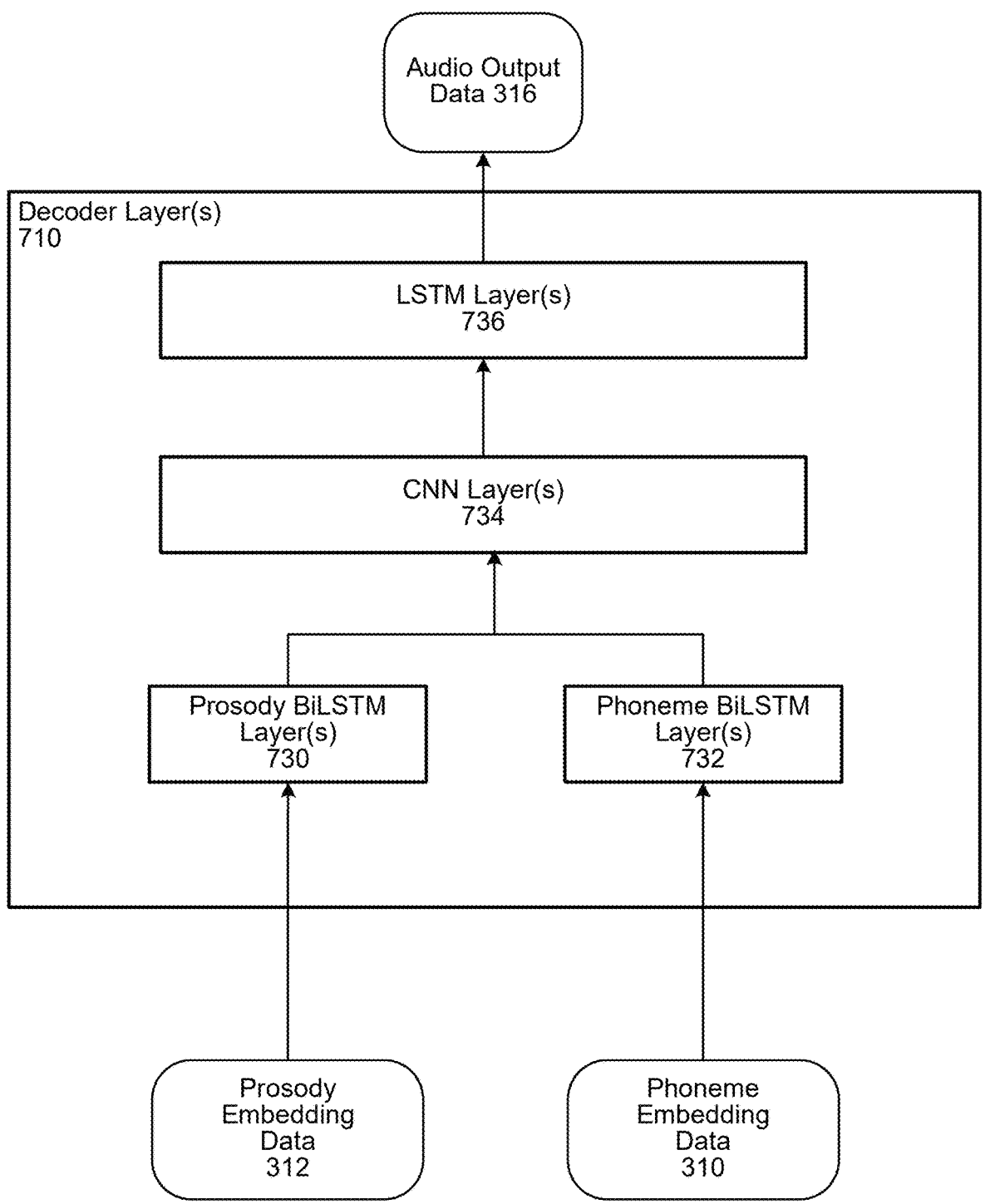
FIG. 7C illustrates components of decoder layers according to embodiments of the present disclosure.

FIG. 7C illustrates components for decoder layers 710 according to embodiments of the present disclosure. A prosody BILSTM layer 730 may process the prosody embedding data 312, and a phoneme BiLSTM layer 732 may process the phoneme embedding data 310. One or more CNN layer(s) 734 may process the outputs of the BiLSTM layers 730, 732, and one or more LSTM layer(s) 736 may process the output(s) of the CNN layers 734 to determine the audio output data 316. In some embodiments, the decoder layers 710 include one BiLSTM layer 730, three CNN layers 734, and three LSTM layers 736. In some embodiments, the output of the LSTM layer(s) 736 is further processed by a postnet layer, which may include linear projection, convolutional, or activation layers, to determine the audio output data 316. As illustrated, the decoder layers 710 may correspond to a non-autoregressive decoder, in which the audio output data 316 is determined by processing the input data, such as the prosody embedding data 312 and the phoneme embedding data 310. In other embodiments, the decoder layers 710 may correspond to an autoregressive decoder, in which the audio output data 316 is determined by processing the input data and at least one previously determined item of audio output data 316 (in other words, the output data is determined based at least in part on previously generated output data). Any type of decoder, including autoregressive and non-autoregressive decoders, is within the scope of the present disclosure.

FIG. 8 is a block diagram conceptually illustrating a user device 110. FIG. 9 is a block diagram conceptually illustrating example components of the remote system 120, which may be one or more servers and which may assist with voice-transfer processing, speech-synthesis processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the system 120, such as one or more servers for performing speech processing. In operation, each of these server (or groups of devices) may include computer-readable and computer-executable instructions that reside on the respective server, as will be discussed further below. Each of these devices/systems (110/120) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), or other types of memory. Each device (110/120) may also include a data storage component (808/908) for storing data and controller/processor-executable instructions. Each data storage component (808/908) may individually include one or more non-volatile storage types such as magnetic storage, optical storage, solid-state storage, etc. Each device (110/120) may also be connected to removable or external non-volatile memory or storage (such as a removable memory card, memory key drive, networked storage, etc.) through respective input/output device interfaces (802/902). The device 110 may further include loudspeaker(s) 812, microphone(s) 820, display(s) 816, or camera(s) 818. The remote system 120 may similarly include antenna(s) 914, loudspeaker(s) 912, microphone(s) 920, display(s) 916, or camera(s) 918.

Computer instructions for operating each device/system (110/120) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device/system (110/120) includes input/output device interfaces (802/902). A variety of components may be connected through the input/output device interfaces (802/902), as will be discussed further below. Additionally, each device (110/120) may include an address/data bus (824/924) for conveying data among components of the respective device. Each component within a device (110/120) may also be directly connected to other components in addition to (or instead of) being connected to other components across the bus (824/924).

Figure 10:
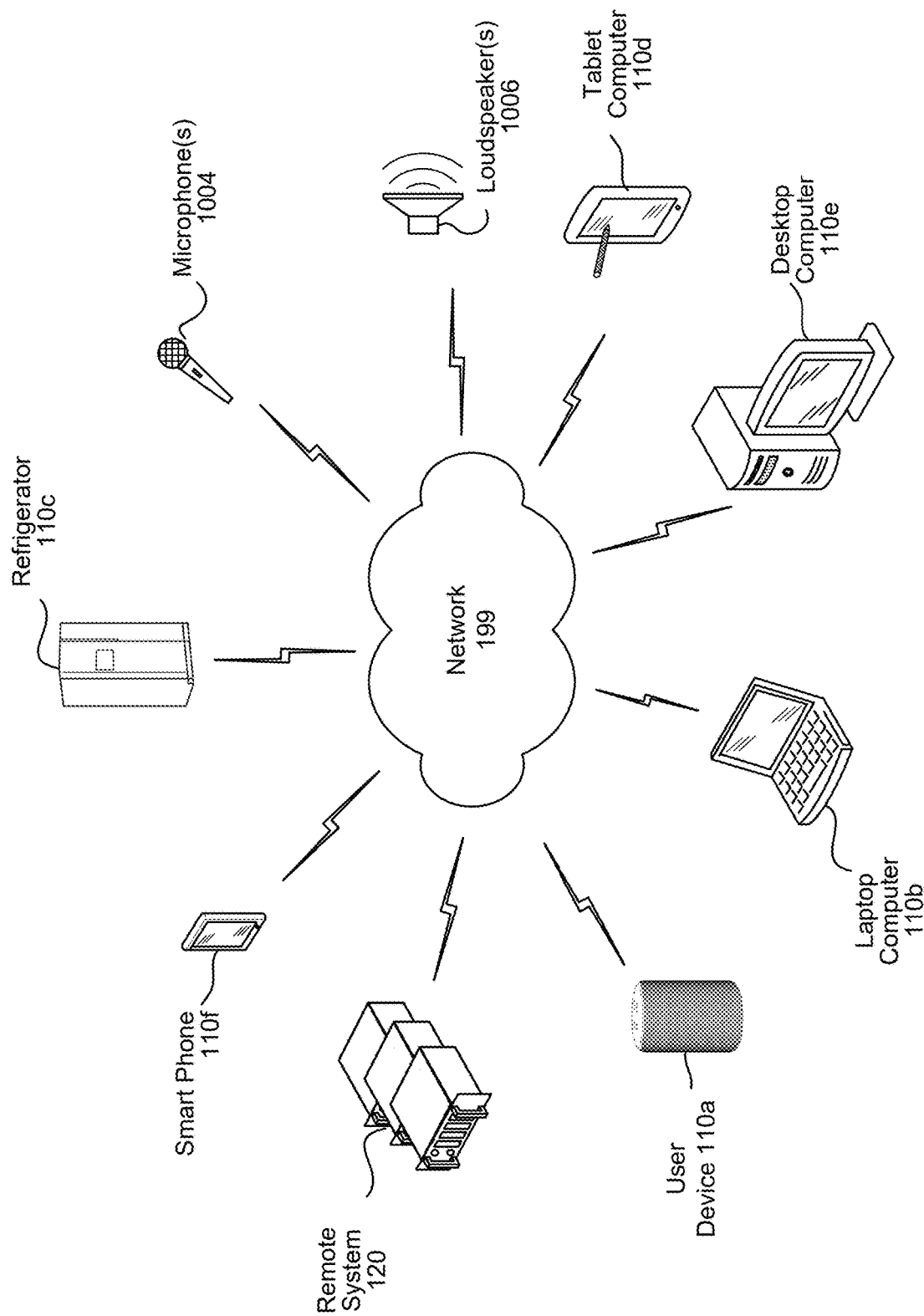
FIG. 10 illustrates a networked computing environment according to embodiments of the present disclosure.

Referring to FIG. 10, the device 110 may include input/output device interfaces 802 that connect to a variety of components such as an audio output component (e.g., a microphone 1004 or a loudspeaker 1006), a wired headset, or a wireless headset (not illustrated), or other component capable of outputting audio. The device 110 may also include an audio capture component. The audio capture component may be, for example, the microphone 820 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display for displaying content. The device 110 may further include a camera.

Via antenna(s) 814, the input/output device interfaces 802 may connect to one or more networks 199 via a wireless local area network (WLAN) (such as WiFi) radio, Bluetooth, or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical systems in a collection of systems or other components.

The components of the device(s) 110 or the system 120 may include their own dedicated processors, memory, or storage. Alternatively, one or more of the components of the device(s) 110 or the system 120 may utilize the I/O interfaces (802/902), processor(s) (804/904), memory (806/906), or storage (808/908) of the device(s) 110 or system 120.

As noted above, multiple devices may be employed in a single system. In such a multi-device system, each of the devices may include different components for performing different aspects of the system's processing. The multiple devices may include overlapping components. The components of the device 110 or the system 120, as described herein, are illustrative, and may be located as a stand-alone device or may be included, in whole or in part, as a component of a larger device or system.

The network 199 may further connect a voice-controlled user device 110a, a tablet computer 110d, a smart phone 110f, a refrigerator 110c, a desktop computer 110e, or a laptop computer 110b through a wireless service provider, over a WiFi or cellular network connection, or the like. Other devices may be included as network-connected support devices, such as a system 120. The support devices may connect to the network 199 through a wired connection or wireless connection. Networked devices 110 may capture audio using one-or-more built-in or connected microphones or audio-capture devices, with processing performed by components of the same device or another device connected via network 199. The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk or other media. In addition, components of one or more of the components and engines may be implemented as in firmware or hardware, such as the acoustic front end, which comprise among other things, analog or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements, or steps are in any way required for one or more embodiments or that one or more embodiments necessarily include logic for deciding, with or without other input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for generating synthesized speech, the method comprising:
   receiving first text data representing written content;
   determining second text data corresponding to a sentence in the written content;
   determining third text data corresponding to a word in the sentence;
   determining fourth text data corresponding to a second word in the sentence, the second word appearing in the sentence before the word;
   processing the second text data using a first component to determine first embedding data corresponding to first prosody data representing first prosody of the sentence;
   after processing the second text data, processing the first embedding data and the third text data using a second component to determine second embedding data, the second embedding data corresponding to the first prosody data and second prosody data representing second prosody of the word;
   processing the first embedding data, the second embedding data, and the fourth text data to determine fourth embedding data corresponding to the first prosody data, the second prosody data, and third prosody data representing third prosody of the second word;
   processing the third text data with an encoder to determine third embedding data representing the third text data;
   generating a first correspondence between the third embedding data and first embedding data, wherein the first correspondence is associated with sentence-level data;
   generating a second correspondence between the third embedding data and the second embedding data, wherein the second correspondence is associated with word-level data;
   processing, based at least in part on the first correspondence and the second correspondence, the first embedding data, the second embedding data, and the third embedding data with a decoder to determine audio data representing the synthesized speech corresponding to the word, the first prosody, and the second prosody; and
   processing the first embedding data, the fourth embedding data, and the second embedding data with the decoder to determine second audio data representing second synthesized speech corresponding to the second word.

2. The computer-implemented method of claim 1, further comprising:
   prior to receiving the first text data, receiving first training text data;
   receiving first training audio data representing speech corresponding to the first training text data;
   processing the first training audio data to determine fifth embedding data corresponding to third prosody data representing third prosody of a second sentence represented in the first training audio data;
   processing the fifth embedding data and a portion of the first training audio data to determine fifth embedding data corresponding to the third prosody data and at fourth prosody data representing fourth prosody of a word in the second sentence;
processing the first training text data with the encoder to determine sixth embedding data representing the first training text data; and
processing the fifth embedding data, the fifth embedding data, and the sixth embedding data with the decoder to determine third audio data representing second synthesized speech corresponding to the first training audio data.

3. A computer-implemented method comprising:
receiving input data representing words;
processing, the input data to determine a first prosody for the input data;
processing a first subset of the input data to determine a second prosody for the first subset;
processing a second subset of the input data to determine a third prosody for the second subset;
processing the input data with an encoder to determine a representation of the words;
generating a first correspondence between the first prosody and the representation, wherein the first correspondence is associated with a first plurality of acoustic units corresponding to the words;
generating, based at least in part on the first correspondence, a second correspondence between the second prosody and the representation, wherein the second correspondence is associated with a second plurality of acoustic units associated with a first word that is a first subset of the first plurality of acoustic units;
generating, based at least in part on the first correspondence, a third correspondence between the third prosody and the representation, wherein the third correspondence is associated with a third plurality of acoustic units associated with a second word that is a second subset of the first plurality of acoustic units and different from the first subset;
generating, based at least in part on the second correspondence and using a decoder, audio data representing first synthesized speech corresponding to the first prosody, the second prosody, and the representation; and
generating, based at least in part on the third correspondence and using the decoder, second audio data representing second synthesized speech corresponding to the first prosody, the third prosody, and the representation.

4. The computer-implemented method of claim 3, wherein:
determining the first prosody comprises processing the input data using a prosody prediction component to determine first embedding data corresponding to the first prosody;
determining the second prosody comprises processing the input data using the prosody prediction component to determine second embedding data corresponding to the second prosody; and
determining the audio data comprises processing the first embedding data and the second embedding data.

5. The computer-implemented method of claim 3, further comprising:
processing a third subset of the input data to determine a fourth prosody of the third subset; and
generating, using the decoder, third audio data representing third synthesized speech corresponding to first prosody, the second prosody, and the third subset.

6. The computer-implemented method of claim 3, further comprising:
Processing the first subset using a first neural network to determine first data corresponding to semantic information of the first subset; and
processing the first data using a recurrent neural network (RNN).

7. The computer-implemented method of claim 3, further comprising:
determining graph data representing the words;
determining node data in the graph data corresponding to the first subset;
processing the node data to determine first data corresponding to syntax information of the first subset; and
processing the first data using a recurrent neural network (RNN).

8. The computer-implemented method of claim 3, further comprising:
receiving third audio data representing speech corresponding to the words;
processing the third audio data to determine a fourth prosody of the third audio data;
processing a second subset of the third audio data to determine a fifth prosody of the second subset; and
generating, using the decoder, fourth audio data representing third synthesized speech corresponding to the fourth prosody, the fifth prosody, and the second subset.

9. The computer-implemented method of claim 3, wherein determining the audio data comprises:
processing first data corresponding to the first prosody and second data corresponding to the representation to determine a correlation between a first value of the first data and a second value of the second data,
wherein the audio data corresponds to the first value and the second value.

10. The computer-implemented method of claim 3, further comprising:
receiving second input data corresponding to a fourth prosody;
processing a second subset of the second input data to determine a fifth prosody for the second subset; and
generating, using the decoder, third audio data representing third synthesized speech corresponding to the fourth prosody, the fifth prosody, and the second subset.

11. The computer-implemented method of claim 3, further comprising:
receiving an indication of a type of the words; and
processing the indication with the decoder to determine third audio data representing third synthesized speech corresponding to the type.

12. A system comprising:
at least one processor; and
at least one memory including instructions that, when executed by the at least one processor, cause the system to:
receive input data representing words;
process, the input data to determine a first prosody for the input data;
process a first subset of the input data to determine a second prosody for the first subset;
process a second subset of the input data to determine a third prosody for the second subset;
process the input data with an encoder to determine a representation of the words;
generate a first correspondence between the first prosody and the representation, wherein the first correspondence is associated with a first plurality of acoustic units corresponding to the words;

generate, based at least in part on the first correspondence, a second correspondence between the second prosody and the representation, wherein the second correspondence is associated with a second plurality of acoustic units associated with a first word that is a first subset of the first plurality of acoustic units;

generate, based at least in part on the first correspondence, a third correspondence between the third prosody and the representation, wherein the third correspondence is associated with a third plurality of acoustic units associated with a second word that is a second subset of the first plurality of acoustic units and different from the first subset;

generate, based at least in part on the second correspondence and using a decoder, audio data representing first synthesized speech corresponding to the first prosody, the second prosody and the representation; and generate, based at least in part on the third correspondence and using the decoder, second audio data representing second synthesized speech corresponding to the first prosody, the third prosody, and the representation.

13. The system of claim 12, wherein the at least one memory further includes instructions that, when executed by the at least one processor, further cause the system to:

process the input data using a prosody prediction component to determine first embedding data corresponding to the first prosody;

process the input data using the prosody prediction component to determine second embedding data corresponding to the second prosody; and process the first embedding data and the second embedding data.

14. The system of claim 12, wherein the at least one memory further includes instructions that, when executed by the at least one processor, further cause the system to:

process a third subset of the input data to determine a fourth prosody of the third subset; and generating, using the decoder, third audio data representing third synthesized speech corresponding to the first prosody, the second prosody, and the third subset.

15. The system of claim 12, wherein the at least one memory further includes instructions that, when executed by the at least one processor, further cause the system to:

process the first subset using a first neural network to determine first data corresponding to semantic information of the first subset; and process the first data using a recurrent neural network (RNN).

16. The system of claim 12, wherein the at least one memory further includes instructions that, when executed by the at least one processor, further cause the system to:

determine graph data representing the words;

determine node data in the graph data corresponding to the first subset;

process the node data to determine first data corresponding to syntax information of the first subset; and process the first data using a recurrent neural network (RNN).

17. The system of claim 12, wherein the at least one memory further includes instructions that, when executed by the at least one processor, further cause the system to:

receive third audio data representing speech corresponding to the words;

process the third audio data to determine a fourth prosody of the third audio data;

process a second subset of the third audio data to determine a fifth prosody of the second subset; and generating, using the decoder, fourth audio data representing third synthesized speech corresponding to the fourth prosody, the fifth prosody, and the second subset.

18. The system of claim 12, wherein the at least one memory further includes instructions that, when executed by the at least one processor, further cause the system to:

process first data corresponding to the first prosody and second data corresponding to the representation to determine a correlation between a first value of the first data and a second value of the second data, wherein the audio data corresponds to the first value and the second value.

19. The system of claim 12, wherein the at least one memory further includes instructions that, when executed by the at least one processor, further cause the system to:

receive an indication of a type of the words; and process the indication with the decoder to determine third audio data representing third synthesized speech corresponding to the type.

* * * * *